US012652567B2

(12) United States Patent
Kazmi et al.

(10) Patent No.: US 12,652,567 B2
(45) Date of Patent: Jun. 9, 2026

(54) PRE-CONFIGURED GAP STATUS AT GAP CONFIGURATION

(71) Applicant: Telefonaktiebolaget LM Ericsson (publ), Stockholm (SE)

(72) Inventors: Muhammad Ali Kazmi, Sundbyberg (SE); Iana Siomina, Täby (SE); Joakim Axmon, Limhamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 302 days.

(21) Appl. No.: 18/552,574

(22) PCT Filed: Apr. 1, 2022

(86) PCT No.: PCT/IB2022/053087
§ 371 (c)(1),
(2) Date: Sep. 26, 2023

(87) PCT Pub. No.: WO2022/208479
PCT Pub. Date: Oct. 6, 2022

(65) Prior Publication Data
US 2024/0172028 A1 May 23, 2024

Related U.S. Application Data

(60) Provisional application No. 63/169,360, filed on Apr. 1, 2021.

(51) Int. Cl.
| | |
|---|---|
| *H04W 24/10* | (2009.01) |
| *H04L 5/00* | (2006.01) |
| *H04L 27/26* | (2006.01) |

(52) U.S. Cl.
CPC ........... *H04W 24/10* (2013.01); *H04L 5/0098* (2013.01); *H04L 27/261* (2013.01)

(58) Field of Classification Search
CPC ............. H04W 24/10; H04W 36/0088; H04L 5/0098; H04L 27/261; H04L 5/001; H04L 5/0048; H04L 27/2602; H04L 5/0023
See application file for complete search history.

(56) References Cited

PUBLICATIONS

Email Discussion Summary for [98e][234]NR_MG_Part_2, Intel (Year: 2021).*
Author Unknown, "Technical Specification Group Radio Access Network; NR; Requirements for support of radio resource management (Release 17)," Technical Specification 38.133, Version 17.0.0, Dec. 2020, 3GPP Organizational Partners, 1,812 pages.
(Continued)

*Primary Examiner* — Ayanah S George
(74) *Attorney, Agent, or Firm* — Withrow & Terranova, PLLC

(57) ABSTRACT

Systems and method for enhancing measurement performances by a User Equipment (UE) by reducing a measurement period. In some embodiments, a method performed by the UE for using a Pre-Configured Measurement Gap Pattern (PMGP) comprises a step of determining a status of the PMGP based on one or more criteria and a step of performing a measurement either using a gap within the PMGP or without using a gap within the PMGP, based on the determined status of the PMGP.

15 Claims, 9 Drawing Sheets

(56)                    References Cited

PUBLICATIONS

Author Unknown, "Technical Specification Group Radio Access Network; NR; Radio Resource Control (RRC) protocol specification (Release 16)," Technical Specification 38.331, Version 16.4.0, Mar. 2021, 3GPP Organizational Partners, 949 pages.

Ericsson, "R4-2206888: Updates to rules for pre-MG status change in TS 38.133," 3GPP TSG-RAN4 Meeting #102-e, Electronic Meeting, Feb. 21-Mar. 3, 2022, 4 pages.

Intel Corporation, et al., "RP-202658: Revised WID on NR and MR-DC measurement gap enhancements," 3GPP TSG RAN Meeting #90e, Dec. 7-11, 2020, Electronic Meeting, 5 pages.

Intel Corporation, "R4-2103715: Email discussion summary for [98e][234] NR_MG_Part_2," 3GPP TSG RAN WG4 Meeting #98-e, Jan. 25-Feb. 5, 2021, Electronic Meeting, 91 pages.

Nokia, et al., "R2-1916193: Discussion on NeedForGap signalling in NR SA before NE-DC or NR-DC configuaration," 3GPP TSG-RAN WG2 Meeting #108, Nov. 18-22, 2019, Reno, Nevada, 5 pages.

International Search Report and Written Opinion for International Patent Application No. PCT/IB2022/053087, mailed Jun. 22, 2022, 14 pages.

* cited by examiner

NETWORK NODE 308

UE 310

600. PMGP STATUS INDICATION (E.G. EXPLICIT INDICATION OF PMGP STATUS INCLUDED IN PMGP CONFIGURATION MESSAGE OR SEPARATE MESSAGE)

602. DETERMINE STATUS OF PMGP BASED ON PMGP STATUS INDICATION

604. PERFORM MEASUREMENT EITHER USING GAP WITHIN PMGP OR WITHOUT USING GAP WITHIN PMGP BASED ON THE DETERMINED STATUS OF PMGP

PRE-CONFIGURED GAP STATUS AT GAP CONFIGURATION

RELATED APPLICATIONS

This application is a 35 U.S.C. § 371 national phase filing of International Application No. PCT/IB2022/053087, filed Apr. 1, 2022, which claims the benefit of provisional patent application Ser. No. 63/169,360, filed Apr. 1, 2021, the disclosures of which are hereby incorporated herein by reference in their entireties.

TECHNICAL FIELD

The present disclosure is related to systems and methods for enhancing measurement performances by a User Equipment (UE) by reducing a measurement period. Also, the present disclosure is related to systems and methods for enhancing system performances by enabling a base station to schedule the UE for data during a measurement gap when the gap is not needed for measurements after a measurement gap pattern is configured in the UE.

BACKGROUND

Bandwidth Part (BWP) Operation

To enable a User Equipment (UE)'s power saving and avoid interference, the UE can be configured by a higher layer with a set of BWPs for signal receptions (e.g., Physical Downlink Control Channel (PDCCH), Physical Downlink Shared Channel (PDSCH)) by the UE (Downlink (DL) BWP set can be, e.g., up to 4 DL BWPs) and a set of BWPs for signal transmissions (e.g., PUCCH, PUSCH) by the UE (Uplink (UL) BWP set can be, e.g., up to 4 UL BWPs) in a serving cell e.g., Special Cell (SpCell) (e.g., Primary Cell (PCell), Primary Secondary Cell Group (SCG) Cell (PS-Cell), Secondary Cell (SCell)).

Each BWP can be associated with multiple parameters. Examples of such parameters are: Bandwidth (BW) (e.g., number of time-frequency resources (e.g., resource blocks such as 25 Physical Resource Blocks (PRBs)), location of BWP in a frequency (e.g., starting Resource Block (RB) index of BWP or center frequency), subcarrier spacing (SCS), cyclic prefix (CP) length, any other baseband parameter (e.g., Multiple Input Multiple Output (MIMO) layer, receivers, transmitters, Hybrid Automatic Repeat Request (HARQ) related parameters).

The UE is served (e.g., receives signals such as PDCCH and PDSCH and transmits signals such as Physical Uplink Control Channel (PUCCH) and Physical Uplink Shared Channel (PUSCH)) in a serving cell only on the active BWP(s). At least one of the configured DL BWPs can be active at a time for reception and at least one of the configured UL BWPs can be active at a time for transmission in each serving cell. For example, the UE can be configured to switch the active BWP based on a timer (e.g., BWP inactivity timer such as 'bwp-InactivityTimer'), by receiving a command or a message from another node (e.g., from the base station (BS)). Examples of commands or messages are DL Control Information (DCI) sent on PDCCH, a Radio Resource Control (RRC) message, a Medium Access Control (MAC) command (e.g., MAC Control Element (CE)), or the like. Any active BWP can be switched independently (e.g., an active UL BWP may be switched independently with respect to an active DL BWP). The active BWP switching operation may involve change in one or more parameters associated with the BWP described above (e.g., bandwidth, frequency location, SCS, etc.). For example, when the timer (e.g., 'bwp-InactivityTimer') expires, the UE is required to switch to a reference active BWP (e.g., a default active BWP, one of the configured BWPs, etc.). In another example, when the UE receives DCI command to switch active BWP, the UE is required to switch its current active BWP to one of the configured BWPs indicated in the command. In yet another example, when the UE receives an RRC message to switch an active BWP, the UE is required to switch its current active BWP to a new BWP (e.g., a newly configured/reconfigured BWP) indicated in the RRC message; this may also be referred to as a reconfiguration of the active BWP. The BWP switching may also include when the UE is first time configured with an active BWP (e.g., when entering RRC connected state).

An example of the active BWP switching is illustrated in FIG. 1. For example, the UE is configured, during four different time periods, with four different BWPs: BWP1, BWP2, BWP3 and BWP4, which are associated with different sets of parameters (e.g., BW, SCS, frequency location, etc.). The UE can be configured to switch its active BWP based on any of a timer, a DCI command, or an RRC message (which also may include an RRC procedure delay, e.g., 10 ms). For example, the UE is switched first from the current active BWP1 to a new BWP2 at time 1, which becomes the new active BWP. The active BWP2 is further switched to BWP3 at time 2, which in turn becomes the new active BWP. The active BWP3 is then further switched to BWP4 at time 3, which in turn becomes the new active BWP. The active BWP switching involves a switching delay (e.g., X number of slots). The switching delay may depend on one or multiple factors such as, for example, the type of BWP switching, the numerology of BWP before and after the switching, the number of serving cells on which the BWP switching is triggered simultaneously, the number of serving cells on which the BWP switching is triggered non-simultaneously (e.g., over partially overlapping time periods), etc. A UE is configured with an initial BWP when, e.g., the UE is accessing the radio network.

Radio Resource Management (RRM) in NR (New Radio)

In NR, reference signals (RS) (e.g., Synchronization Signal Block (SSB), Channel State Information Reference Signal (CSI-RS), Positioning Reference Signal (PRS), etc.) are used by the UE for performing different types of measurements for different purposes (e.g., for mobility, for RLM related procedure, for beam management (BM) related procedure, for positioning, for scheduling and link adaptation, etc.).

Mobility measurements are done on RSs of serving and neighbor cells. Examples of mobility measurements include cell detection or cell identification, signal quality, signal strength, etc. Specific examples of signal strength measurements include path loss, received signal power, Reference Signal Received Power (RSRP), Synchronization Signal RSRP (SS-RSRP), etc. Specific examples of signal quality measurements include received signal quality, Reference Signal Received Power (RSRQ), Signal to Interference plus Noise Ratio (SINR), Synchronization Signal RSRQ (SS-RSRQ), Synchronization Signal SINR (SS-SINR), Signal to Noise Ratio (SNR), etc.

Examples of RLM related measurements include out of sync (OOS) evaluation/detection, in sync (IS) evaluation/detection etc.

Examples of BM related measurements are beam failure detection, candidate beam detection, L1-RSRP, etc.

Examples of measurements for scheduling and link adaptation include channel state information (CSI) measurements such as, for example, channel quality indicator (CQI), rank indicator (RI), precoding matrix indicator (PMI), etc.

In NR, in one example, the UE can be configured to perform and report measurements on one or more beams in a cell (e.g., beam-level measurement). In this case, the UE may measure on a beam and transmit measurement results including, e.g., signal measurement (e.g., SS-RSRP) of the beam and the beam index (e.g., SSB index, CSI-RS index, etc.).

In another example, the UE can be configured to perform and report measurements on one or more cells (e.g., cell level measurement). In this case, the UE may measure one or more beams, derive cell-level measurement results based on the measurements, and transmit the cell-level measurement results comprising, e.g., signal measurement (e.g., SS-RSRP) of the cell. The beam-level measurement results of one or more beams may be averaged by the UE to derive the cell-level measurement.

Measurement Gap Pattern (MGP)

MGP is used by the UE for performing measurements on cells of the serving carriers and non-serving carriers (e.g., inter-frequency carrier, inter-Radio Access Technology (RAT) carriers, etc.). In NR, gaps are used for measurements on cells of the serving carrier in some scenarios (e.g., when the measured signals (e.g., SSB, CSI-RS, PRS, etc.) are not fully within the active BWP of the serving cell).

In an example, a gap in the MGP may be a time period during which the UE is not required to conduct reception/transmission from/to the corresponding serving cell except the reception of signals used for measurement. In another example, a gap in the MGP may be a time period during which the UE is not required to conduct reception/transmission from/to the corresponding serving cell, except the reception of signals used for measurement and/or signals used for random access procedure. In another example, a gap in the per-UE MGP may be a time period during which the UE is not required to conduct reception/transmission from/to the corresponding NR serving cells, except the reception of signals used for RRM measurement(s), PRS measurement(s), and the signals used for random access procedure. In another example, a gap in the per-FR MGP may be a time period during which the UE is not required to conduct reception/transmission from/to the corresponding NR serving cells in the corresponding frequency range, except the reception of signals used for RRM measurement(s), PRS measurement(s) and the signals used for random access procedure. The UE is scheduled in the serving cell only within a BWP (e.g., at a frequency within a bandwidth of a BWP). During the gap, the UE cannot be scheduled for receiving/transmitting signals in one or more serving cells.

The MGP is characterized or defined by several parameters: measurement gap length (MGL), measurement gap repetition period (MGRP), and measurement gap time offset with respect to reference time (e.g., slot offset with respect to serving cell's System Frame Number (SFN) such as SFN=0). The MGRP is also called as measurement gap periodicity. An example of the MGP is shown in FIG. 2. As an example, the MGL can be, for example, 1.5 ms, 3 ms, 3.5 ms, 4 ms, 5.5 ms, 6 ms, 10 ms, 20 ms etc., and the MGRP can be, for example, 20 ms, 40 ms, 80 ms, 160 ms, etc. Such type of MGP is configured by the network node and is also called as network-controlled or network-configurable MGP. Therefore, the serving base station is fully aware of the timing of each gap within the MGP. Measurement gaps may also be configured/applicable for a specific purpose, e.g., RRM measurements, positioning measurements, RLM, beam management, etc.

The measurement gaps can be UE-specific or carrier-specific. In the former (UE-specific) case, the gaps are created on all serving cells of the UE. In the latter (carrier-specific) case, the gaps are created only on a subset of serving cells of the UE (e.g., on serving cells operating on carriers of specific frequency range (FR)). Therefore, carrier-specific gaps are also called as per-FR gaps (e.g., per FR1, per FR2, etc.).

According to some embodiments, all UEs support per-UE gaps. Whether the UE also supports carrier specific or per-FR gaps may depend on the UE capability.

A pre-configured measurement gap pattern (PMGP) refers to a type of MGP, which is pre-configured but it can be activated or deactivated based on one or more criteria or condition. The PMGP can be configured per UE (e.g., apply to all serving carriers in all cell groups if DC is configured) or per FR (e.g., apply to serving carriers in the same group in DC scenario (e.g., per FR1, per FR2, etc.)) The UE may also be configured with combination of per UE and per FR PMGPs. The UE uses the PMGP for performing certain measurements only when it is activated. The PMGP is not used by the UE for performing the measurements when it is deactivated. When PMGP is deactivated, the network may schedule the UE during the gaps of the PMGP enhancing user and system throughput.

SUMMARY

Embodiments of enhancing measurement performances by a User Equipment (UE) by reducing a measurement period are disclosed herein. In one embodiment, a method performed by the UE for using a Pre-Configured Measurement Gap Pattern (PMGP) comprises a step of determining a status of the PMGP based on one or more criteria and a step of performing a measurement either using a gap within the PMGP or without using a gap within the PMGP, based on the determined status of the PMGP. In some aspects, the embodiment enhances measurement performance by reducing a measurement period since the PMGP can be used immediately for measurements after configuration, if needed.

In one embodiment, the determined status of the PMGP is either activated or deactivated.

In one embodiment, the one or more criteria comprise a relation or association between a reference signal configured for measurement and an active bandwidth part on a serving cell of the UE.

In one embodiment, the one or more criteria comprise a criterion that a reference signal configured for measurement be fully within a bandwidth of an active bandwidth part on a serving cell of the UE.

In one embodiment, determining the status of the PMGP based on the one or more criteria comprises determining that the status of the PMGP is to be deactivated if the reference signal configured for measurement is fully within the bandwidth of the active bandwidth part on the serving cell of the UE.

In one embodiment, determining the status of the PMGP based on the one or more criteria comprises determining that the status of the PMGP is to be activated if the reference signal configured for measurement is not fully within the bandwidth of the active bandwidth part on the serving cell of the UE.

In one embodiment, the reference signal is a Synchronization Signal Block (SSB).

In one embodiment, the one or more criteria comprises a criterion of whether the UE is configured for performing a measurement which needs measurement gaps.

In one embodiment, the one or more criteria comprises a criterion of whether the UE is configured to perform one or more certain types of measurements.

In one embodiment, the one or more certain types of measurements comprise inter-frequency measurements, intra-frequency measurements, or inter-RAT measurements.

In one embodiment, the method further comprises obtaining a PMGP configuration from a network node. The step of determining the status of the PMGP includes determining the status of the PMGP based on the PMGP configuration.

In one embodiment, the step of performing the measurement comprises performing the measurement during a gap within the PMGP responsive to the determined status of the PMGP being activated.

In one embodiment, the step of performing the measurement comprises performing the measurement without using a gap in the PMGP responsive to the determined status of the PMGP being deactivated.

In one embodiment, the one or more criteria is pre-defined or configurable by a network node in communication with the UE.

In one embodiment, the step of determining the status of the PMGP comprises receiving a message from a network node in communication with the UE. The message indicates the status of the PMGP.

In one embodiment, a method performed by a UE for using a PMGP comprises receiving a PMGP status indication from a network node, determining a status of the PMGP based on the received PMGP status indication, and performing a measurement either using a gap within the PMGP or without using a gap within the PMGP, based on the determined status of the PMGP.

In one embodiment, the PMGP status indication is included in a PMGP configuration message or in a separate message that is not a PMGP configuration message.

In one embodiment, the step of performing the measurement comprises performing the measurement during the gap within the PMGP when the received PMGP status indication indicates that the PMGP is activated.

In one embodiment, the step of performing the measurement comprises performing the measurement without the PMGP when the received PMGP status indication indicates that the PMGP is deactivated.

In one embodiment, a method performed by a network node for communicating with a UE comprises determining a PMGP status indication that is an explicit indication of a status of the PMGP and transmitting the PMGP status indication to the UE.

In one embodiment, the determined PMGP status indication indicates that the PMGP is either activated or deactivated.

In one embodiment, the PMGP status indication is included in a PMGP configuration message or in a separate message that is not a PMGP configuration message.

Corresponding embodiments of the UE and the network node are also disclosed.

In one embodiment, a UE for using PMGP is adapted to determine a status of the PMGP based on one or more criteria and perform a measurement either using a gap within the PMGP or without using a gap within the PMGP, based on the determined status of the PMGP.

In one embodiment, a UE comprises one or more transmitters, one or more receivers, and processing circuitry associated with the one or more transmitters and the one or more receivers. The processing circuitry is configured to cause the UE to determine a status of the PMGP based on one or more criteria and perform a measurement either using a gap within the PMGP or without using a gap within the PMGP, based on the determined status of the PMGP.

In one embodiment, a UE for using PMGP is adapted to receive a PMGP status indication from a network node, determine a status of the PMGP based on the received PMGP status indication, and perform a measurement either using a gap within the PMGP or without using a gap within the PMGP, based on the determined status of the PMGP.

In one embodiment, a UE comprises one or more transmitters, one or more receivers, and processing circuitry associated with the one or more transmitters and the one or more receivers. The processing circuitry is configured to cause the UE to receive a PMGP status indication from a network node, determine a status of the PMGP based on the received PMGP status indication, and perform a measurement either using a gap within the PMGP or without using a gap within the PMGP, based on the determined status of the PMGP.

In one embodiment, a network node for communicating with a UE is adapted to determine a PMGP, status indication that is an explicit indication of a status of the PMGP and transmit the PMGP status indication to the UE.

In one embodiment, a network node for communicating with a UE comprising processing circuitry configured to cause the network node to determine a PMGP, status indication that is an explicit indication of a status of the PMGP and transmit the PMGP status indication to the UE.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
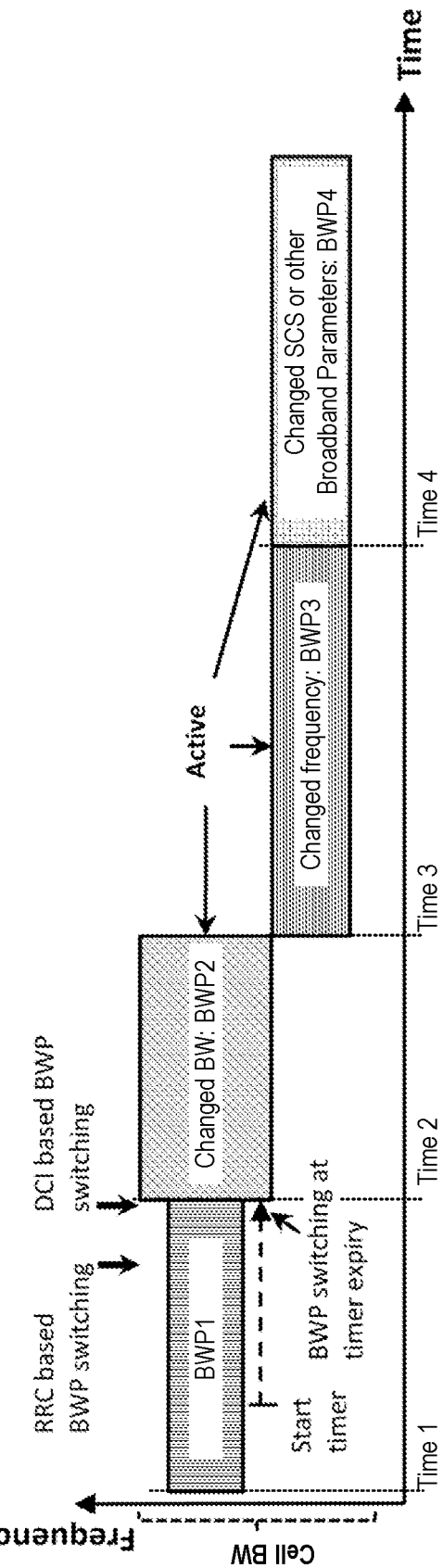
FIG. 1 illustrates examples of active Bandwidth Part (BWP) switching.
Figure 2:
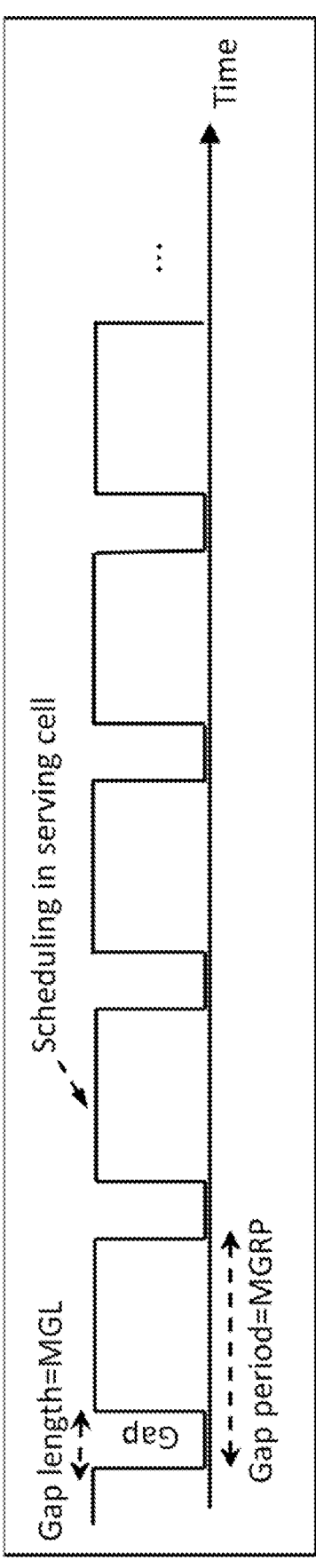
FIG. 2 illustrates an example of the measurement gap pattern in New Radio (NR).

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein; the disclosed subject matter should not be construed as limited to only the embodiments set forth herein; rather, these embodiments are provided by way of example to convey the scope of the subject matter to those skilled in the art.

Terminology

In some aspects, the term 'node' may refer to a network node, to a wireless device, or to a User Equipment (UE).

Examples of network nodes include NodeB, base station (BS), multi-standard radio (MSR) radio node such as MSR BS, eNodeB, gNodeB, Master NodeB (MeNB), Secondary NodeB (SeNB), Location Measurement Unit (LMU), Integrated Access Backhaul (IAB) node, network controller, Radio Network Controller (RNC), Base Station Controller (BSC), relay, donor node controlling relay, base transceiver station (BTS), Central Unit (e.g., in a gNB), Distributed Unit (e.g., in a gNB), Baseband Unit, Centralized Baseband, Centralized Radio Access Network (C-RAN), access point (AP), transmission points, transmission nodes, transmission reception point (TRP), Remote Radio Unit (RRU), Remote Radio Head (RRH), nodes in distributed antenna system (DAS), core network node (e.g., Mobile Switching Center (MSC), Mobility Management Entity (MME), etc.), Operation and Maintenance (O&M), Operations Support System (OSS), Self-Optimized Network (SON), positioning node (e.g., Evolved-Serving Mobile Location Centre (E-SMLC)), etc.

The non-limiting term, UE, may refer to any type of a wireless device communicating with a network node and/or with another UE in a cellular or mobile communication system. Examples of a UE include target device, device to device (D2D) UE, vehicular to vehicular (V2V), machine type UE, Machine Type Communication (MTC) UE or UE capable of machine to machine (M2M) communication, Personal Data Assistant (PDA), tablet, mobile terminals, smart phone, laptop embedded equipment (LEE), laptop mounted equipment (LME), Universal Serial Bus (USB) dongles, etc. In some aspects, a UE and/or a wireless device may be, may include, or may be included within one or more devices discussed with respect to FIGS. 3-8.

The term radio access technology, or Radio Access Technology (RAT), may refer to any RAT e.g., Universal Terrestrial Radio Access (UTRA), Evolved UTRA (E-UTRA), narrow band internet of things (NB-IOT), Wi-Fi, Bluetooth, next generation RAT, New Radio (NR), 4G, 5G, etc. Any of the equipment denoted by the term node, network node, or radio network node may be capable of supporting a single RAT or multiple RATs.

The term 'signal' or 'radio signal' may refer to any physical signal or physical channel. Examples of Downlink (DL) physical signals include reference signal (RS) such as Primary Synchronization Signal (PSS), Secondary Synchronization Signal (SSS), Channel State Information Reference Signal (CSI-RS), Demodulation Reference Signal (DMRS) signals in SS/PBCH block (SSB), discovery reference signal (DRS), cell reference signal (CRS), positioning reference signal (PRS) etc.

A RS may be periodic (e.g., RS occasion carrying one or more RSs may occur with certain periodicity (e.g., 20 ms, 40 ms, etc.)). The RS may also be aperiodic. Each SSB may carry NR-PSS, NR-SSS and NR-Physical Broadcast Channel (NR-PBCH) in, for example, four successive symbols. One or multiple SSBs are transmit in one SSB burst which is repeated with certain periodicity (e.g., 5 ms, 10 ms, 20 ms, 40 ms, 80 ms, or 160 ms).

The UE is configured with information about SSB on cells of certain carrier frequency by one or more SS/PBCH block measurement timing configuration (SMTC) configurations. The SMTC configuration comprises parameters such as SMTC periodicity, SMTC occasion length in time or duration, SMTC time offset with respect to reference time (e.g., serving cell SFN), etc. Therefore, SMTC occasion may also occur with certain periodicity (e.g., 5 ms, 10 ms, 20 ms, 40 ms, 80 ms or 160 ms).

Examples of UL physical signals include reference signal such as SRS, DMRS etc. The term physical channel may refer to any channel carrying higher layer information e.g., data, control etc. Examples of physical channels are PBCH, Narrow band PBCH (NPBCH), Physical Downlink Control Channel (PDCCH), Physical Downlink Shared Channel (PDSCH), shortened Physical Uplink Control Channel (sPUCCH), shortened PDSCH (SPDSCH), shortened Physical Uplink Shared Channel (sPUSCH), MTC PDCCH (MPDCCH), NB IoT PDCCH (NPDCCH), NB-IOT PDSCH (NPDSCH), Enhanced PDCCH (E-PDCCH), Physical Uplink Shared Channel (PUSCH), Physical Uplink Control Channel (PUCCH), NB IoT PUSCH (NPUSCH), etc.

The term 'time resource' may refer to any type of physical resource or radio resource expressed in terms of length of time. Examples of time resources include a symbol, a time slot, a subframe, a radio frame, a Transmission Time Interval (TTI), an interleaving time, a slot, a sub-slot, a mini-slot, etc.

'Active BWP switching,' as used herein, may refer to switching between any two BWPs in DL and/or in UL of a serving cell. The active BWP switching may also comprise switching between a non-dormant BWP and a dormant BWP on a serving cell (e.g., Secondary Cell (SCell)). In a serving cell with a dormant BWP, the UE may not be expected to monitor the control channels but may be expected to perform measurements (e.g., Radio Resource Management (RRM), Channel State Information (CSI), etc.). In a serving cell with a non-dormant BWP, the UE may be expected to monitor the control channels as well as perform other tasks (e.g., perform measurements). The active BWP switching may also be referred to as active BWP change, active BWP modification, and/or simply BWP switching.

There currently exist certain challenge(s).

The pre-configured measurement gap pattern (PMGP) is configured via higher layers (e.g., Radio Resource Control (RRC)). But even after the PMGP is configured, it may or may not be used by the UE for measurements all the time.

For example, PMGP is used for measurements when a certain condition(s) is met. The status of the PMGP when it is configured for the first time or re-configured is unclear and undefined. The undefined behavior at the configuration may either delay the usage of PMGP (e.g., if always considered deactivated) or it may lead to unnecessary throughput loss (e.g., if always considered activated). Therefore, the UE behavior and procedure to define status of the PMGP may need to be specified, as contemplated in this disclosure.

Certain aspects of the present disclosure and their embodiments may provide solutions to these or other challenges. As discussed above, a UE may be configured with a PMGP by the network (e.g., via RRC). There are, as proposed herein, various embodiments which address one or more of the issues disclosed herein.

According to first embodiments, the UE may determine whether the PMGP is in activation status (e.g., activated) or in deactivation status (e.g., deactivated) upon the configuration of the PMGP based on one or more criterion or rule, which can be pre-defined, configurable by the network node, or based on a message from another node (e.g., another BS).

Examples of such criterion or rule may include:
(1) when PMGP is being configured, whether a frequency associated with the measured RS (e.g., SSB) is within a bandwidth of the active BWP (e.g., PMGP status is considered as deactivated) or the measured RS (e.g., SSB) is not fully within the bandwidth of the active BWP (e.g., PMGP status is considered activated). The frequency associated with the measured RS (e.g., SSB) may also be referred to as bandwidth of the RS, measurement bandwidth, bandwidth which contains the frequency of the RS, etc.
(2) when PMGP is being configured, if there is an ongoing data transmission in the DL or the UL (e.g., downlink control information, ongoing Hybrid Automatic Repeat Request (HARQ) process, etc.), then PMGP status is considered as deactivated; otherwise (if no ongoing data transmission) the PMGP status is considered as activated.

Examples of determining the status based on a message from another node (e.g., received via dedicated signaling or broadcast/multicast or system information) may include:
(1) The initial PMGP status is explicitly configured or indicated in a message (in one example, the message can be the same message comprising the MGRP configuration; in another example, it can be a different message or indication (RRC, DCI, MAC CE, etc.).
(2) The initial PMGP status is determined based on a condition or parameter comprised in a message (e.g., the status is determined to be activated if the result of checking whether the condition comprised in the message or the result of comparison of the parameter to a threshold is R1, the status is determined to be deactivated if the result of checking whether the condition comprised in the message or the result of comparison of the parameter to a threshold is R2, where the threshold can be, for example, configurable or pre-defined; in another example, the parameter comprises a threshold based on which the UE can determine the status, etc.). Some examples of the condition or parameters can comprise any one or more of:
(a) signal types or signal configurations (when the UE is configured with measurements based on signals of the indicated types or configuration, the status is determined to be activated [in one example] or to be deactivated [in another example]), (b) measurement types (when the UE is configured with measurements of the indicated types or purpose or with the indicated measurement configuration then the status is determined to be activated [in one example] or to be deactivated [in another example]),
(c) related to data transmissions (e.g., any of K1, K2, K3, K4, K6, etc.) described herein,
(d) Discontinuous Reception (DRX) configuration (e.g., the smallest DRX cycle length at which the status is determined as activated).
More examples of the parameters can be found further herein in the description of the criteria and rules used by the UE for determining the PMGP status upon the PMGP configuration.

In another aspect of this embodiment, the UE determines the time to from which the determined status shall apply:
(1) In one example, time t0 may be a time associated with the beginning of the first gap within the PMGP which occurs after the PMGP is configured.
(2) In another example, more generally, time t0 may be a time associated with the beginning of the first gap of the PMGP which occurs Δt (Δt can be pre-defined or configured, e.g., 0, 5 ms, 10 ms, 15 ms, etc.) after the PMGP is configured or after PMGP configuration is received by the UE.
The UE uses the determined PMGP status upon PMGP configuration for one or more tasks for operations. For example:
(1) In one example, when the determined PMGP status is determined to be "activated," the UE can use the PMGP for measurements immediately after the PMGP is configured (e.g., from first gap occurrence after the time point when PMGP is configured wherein the gap occurrence is determined SFN and gap offset); otherwise, when the PMGP is determined to be deactivated, the UE refrain from using the PMGP for measurements until the status is changed to activated (e.g., at later time).
(2) In another example, when the determined PMGP status is determined to be deactivated, the UE can transmit and/or receive signals during one or more gaps within the PMGP; otherwise, when PMGP is determined to be activated, the UE may not transmit or receive any signal during the one or more gaps within the PMGP.

According to second embodiments, when the UE is unable to determine the status of the PMGP based on one or more criteria (e.g., as discussed in first embodiment), the UE may determine the status of PMGP based on a rule (e.g., default status, configured status, etc.).

In some aspects, the UE can implement one or more methods for determining the status of the PMGP (e.g., method 1, method 2, and/or method 3), and choose the applicable method based on a rule or the available information/configuration for a certain method. In an example, the UE may receive information associated with the status of the PMGP from another node (also referred to as method 1 or as a message-based method), otherwise it can try to determine based on a rule (also referred to as method 2), and if method 2 is not applicable the UE can determine a default or pre-defined status (also referred to as method 3 or as a default-based method).

An aspect of the disclosure is that activation or deactivation status of the PMGP at RRC configuration (or reconfiguration) is determined by the UE based on one or more criteria. The UE determines the PMGP at RRC configuration (or reconfiguration) to be activated if at least one criterion (e.g., measured SSB is at a frequency within a bandwidth of the active BWP) for PMGP activation is met; otherwise (e.g., measured SSB is at a frequency not fully within the bandwidth of the active BWP) the UE determines that the PMGP is deactivated.

Certain embodiments may provide one or more of the following technical advantage(s). In some aspects, the embodiments enhance measurement performance by reducing a measurement period since the PMGP can be used immediately for measurements after configuration, if needed. In some aspects, the embodiments enhance system performance (e.g., increase end-user throughput, reduce time in connected mode for receiving and/or transmitting a given amount of data) by enabling the base station to schedule the UE during gaps since the UE can be scheduled during gaps of PMGP if it is not needed for measurements immediately after configuration of the PMGP. In some aspects, the embodiments enable UE behavior regarding the use of PMGP for measurements right from a time of the PMGP configuration to be well defined.

Figure 3:
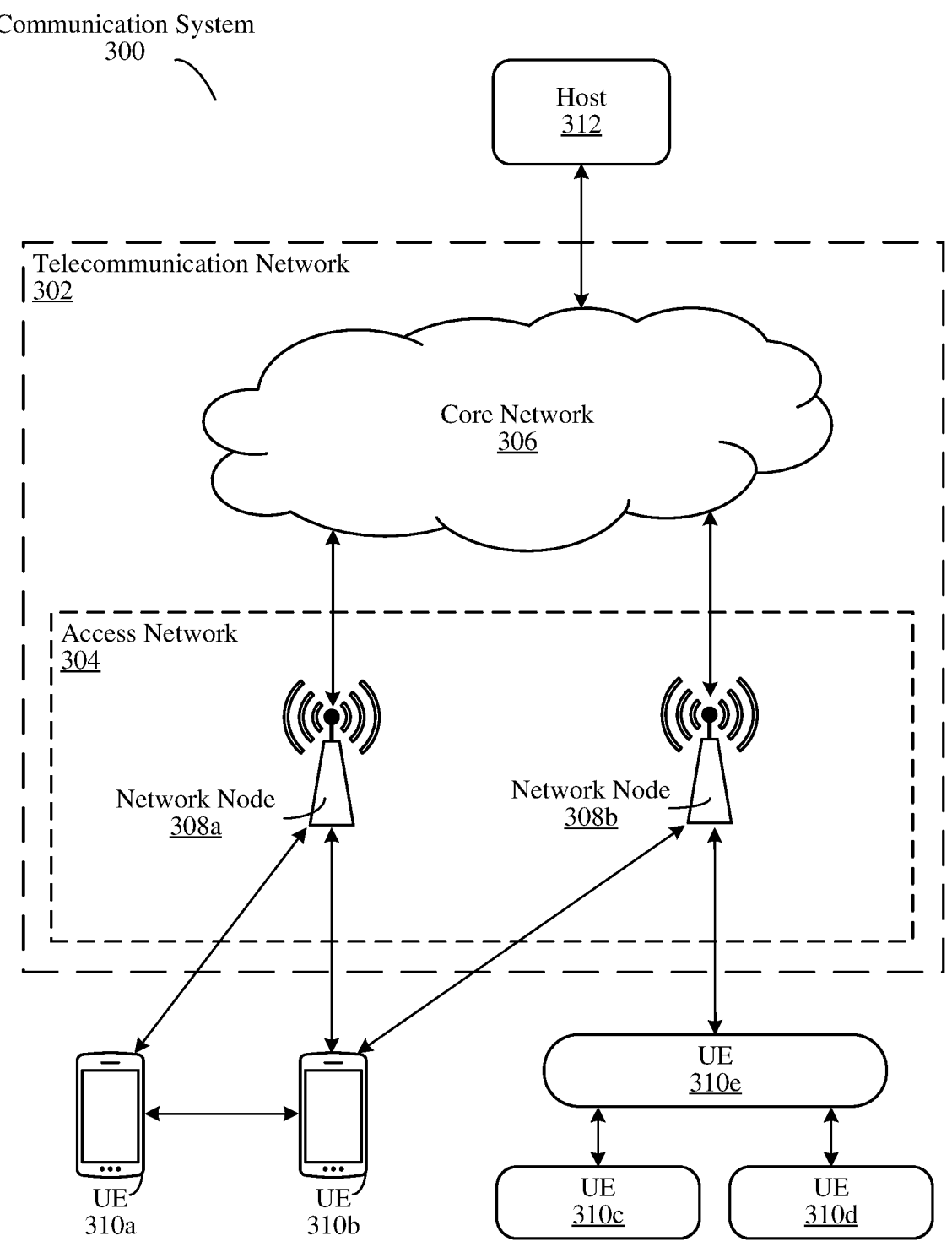
FIG. 3 illustrates an example of a communication system in accordance with some embodiments.

FIG. 3 shows an example of a communication system 300 in accordance with some embodiments. Although the subject matter described herein may be implemented in any appropriate type of system using any suitable components, the embodiments disclosed herein are described in relation to various network elements, such as those shown in FIG. 3.

In the present example, the communication system 300 includes a telecommunication network 302 that includes an access network 304, such as a radio access network (RAN), and a core network 306. The access network 304 includes one or more access network nodes, such as network nodes 308a and 308b, or any other similar 3GPP access node or non-3GPP access point, facilitating direct or indirect connection of a user equipment (UE), such as by connecting one or more of the UEs 310a, 310b, 310c, 310d, and 310e to the core network 306 over one or more wireless connections.

Examples of wireless communications performed over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 300 may include any number of wired or wireless networks, network nodes, UEs, and/or any other components or systems that may facilitate or participate in the communication of data and/or signals whether via wired or wireless connections. The communication system may include and/or interface with any type of communication, telecommunication, data, cellular, and/or radio network or other similar type of system.

UEs 310a, 310b, 310c, 310d, 310e may be any of a wide variety of communication devices, including wireless devices arranged, configured, and/or operable to communicate wirelessly with network nodes 308a, 308b, and other communication devices. Similarly, the network nodes 308a, 308b are arranged, capable, configured, and/or operable to communicate directly or indirectly with UEs and/or with other network nodes or equipment in the telecommunication network 302 to enable and/or provide network access, such as wireless network access, to the UEs and/or to perform other functions, such as administration in the telecommunication network 302.

In the present example, the core network 306 connects the network nodes 308a, 308b in the access network 304 to one or more hosts, such as host 312. These connections may be direct or indirect via one more intermediary networks or devices. In other examples, network nodes may be directly coupled to hosts. The core network 306 may include one more computing devices that are configured (e.g., with hardware and software) to perform core network operations. Examples of core network operations include providing a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 312 may be under the ownership or control of a service provider other than an operator or provider of the access network 304 and/or the telecommunication network 302, and may be operated by the service provider or on behalf of the service provider. The host 312 may host a variety of applications to provide one or more services. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 300 of FIG. 3 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards or any applicable future generation standard (e.g., 6G); wireless local area network (WLAN) standards, such as the Institute of Electrical and Electronics Engineers (IEEE) 802.11 standards (WiFi); and/ or any other appropriate wireless communication standard, such as the Worldwide Interoperability for Microwave Access (WiMax), Bluetooth, Z-Wave and/or ZigBee standards.

In some examples, the telecommunication network 302 is a cellular network that implements 3rd Generation Partnership Project (3GPP) standardized functionalities. Accordingly, the telecommunications network 302 may support network slicing to provide different logical networks to different devices that are connected to the telecommunication network 302. For example, the telecommunications network 302 may provide Ultra Reliable Low Latency Communication (URLLC) services to some UEs, while providing Enhanced Mobile Broadband (eMBB) services to other UEs, and/or Massive Machine Type Communication (mMTC) services to yet further UEs.

In some examples, a UE 310 is configured to transmit and/or receive information without direct human interaction. For instance, a UE may be designed to transmit information to the access network 304 on a predetermined schedule, when triggered by an internal or external event, or in response to requests from the access network 304. Additionally, a UE may be configured for operating in single- or multi-RAT or multi-standard mode. For example, UE may operate with any one or combination of Wi-Fi, NR, and LTE, i.e., being configured for multi-radio dual connectivity (MR-DC), such as E-UTRAN New Radio-Dual Connectivity (EN-DC). UEs may include one or more sensors, actuators, and/or a screen. Other examples of a UE include virtual reality (VR) or augmented reality (AR) headset, a Machine- 2-Machine (M2M) device, an internet of things (IOT) device, an internet of everything (IoE) device, or any other type of device which is capable of accessing a communication network.

In the present example, the UE 310e communicates with the access network 304 to facilitate indirect communication between one or more UEs (e.g., UE 310c, 310d) and one or more network nodes (e.g., network node 308b). The UE 310e may be, for example, a hub, controller, router, content source and analytics, or any of the other communication devices described herein regarding UEs. In another example, the UE 310e may be a broadband router enabling access to the core network 306 for the UEs 310c and 310d. As another example, the UE 310e may be a controller that sends commands or instructions to one or more actuators in the UEs 310c and 310d. Commands or instructions may be received from a UE 310c, 310d, from the network node 308b, or by executable code, script or process instructions in the UE 310e. As another example, the UE 310e may be a data collector, and act as a temporary storage for data from a UE 310c, 310d and, in some embodiments, may perform analysis or other processing of the data. As another example, the UE 310e may be a content source. For example, when the UE 310c or 310d is a VR headset, display, loudspeaker or other media delivery device, the UE 310e may retrieve VR assets, video, audio, or other media via the network node 308b which the UE 310e then provides to the UE either directly, after performing local processing, and/or after adding additional local content. In still another example, the UE 310e acts as a proxy server or orchestrator for the UEs 310c, 310d, in particular in if one or more of the UEs are low energy IoT devices.

The UE 310e may have a constant/persistent or intermittent connection to the network node 308b. The UE 310e may also allow for a different communication scheme and/or schedule between the UE 310e and the UE (e.g., 310c) and between the UE 310e and the core network 306. In other examples, the UE 310e is connected to the core network 306 and/or one or more of the UEs 310c and 310d via a wired connection. Moreover, the UE 310e may be configured to connect to a M2M service provider over access network 304 and/or to another UE over a direct connection. In some scenarios, UEs 310c, 310d may establish a wireless connection with network nodes 308a, 308b while still connected via the UE 310e via a wired or wireless connection. In some embodiments, the UE 310e may be a dedicated hub—that is, a hub whose primary function is to route communications to/from the UEs 310c and 310d from/to the network node 308b. In other embodiments, the UE 310ea non-dedicated hub—that is, a device which is capable of operating to route communications between the UEs 310c, 310d and network node 308b, but which is additionally capable of operating as a communication start and/or end point for certain data channels.

Embodiments

Figure 4:
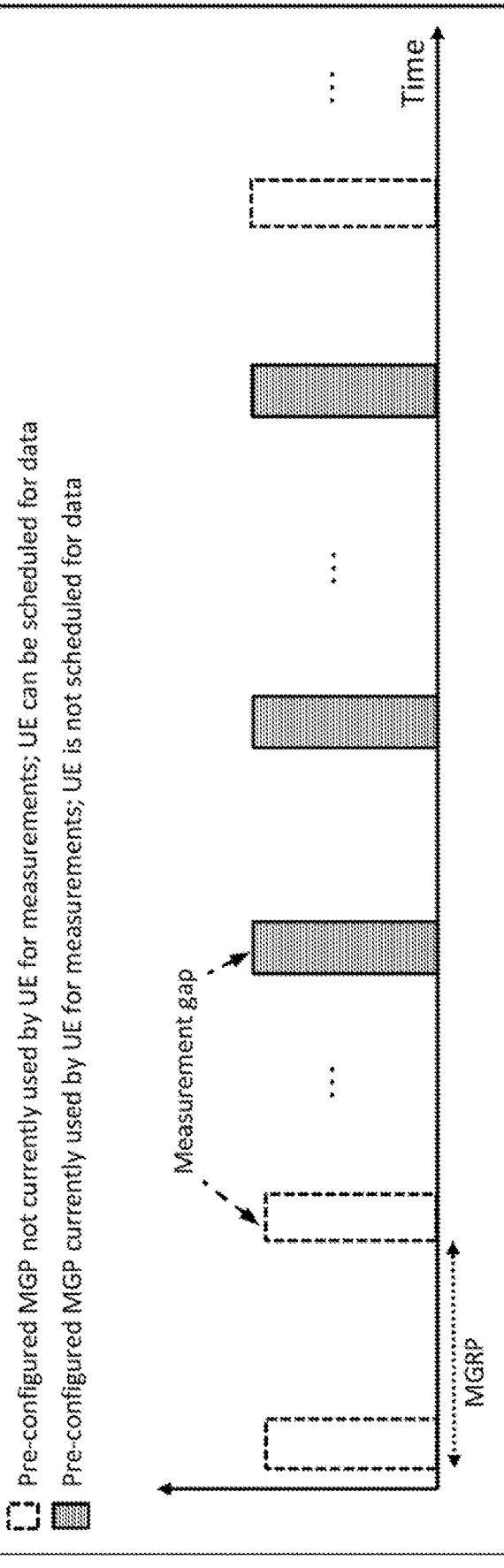
FIG. 4 illustrates an example of Pre-configured Measurement Gap Pattern (PMGP), which a User Equipment (UE) may not use for measurements all the time. The UE may be scheduled for data exchange during the gaps when PMGP is not used.

In a scenario, a UE 310 is configured with a PMGP by the network node 308 (e.g., via RRC signaling). An example of the PMGP is illustrated in FIG. 4. The PMGP configuration may also be referred to as a reconfiguration, a setup, a modification, an addition of PMGP, etc. A configuration message may comprise one or more elements or parameters required by the UE 310 for configuring the UE 310 to use the PMGP. Examples of such parameters include a pre-defined PMGP identifier, measurement gap length (MGL), measurement gap repetition period (MGRP), timing information related to time instance at which or from when the PMGP is configured for the UE 310 (e.g., from the moment the PMGP can be usable for measurement if also activated), whether PMGP is per UE or per FR (whether per FR1 and/or per FR2), indicator of a cell (e.g., PCell, PSCell, etc.) used for timing reference for gap configuration etc. The timing information for PMGP configuration may comprise a gap offset (e.g., gapOffset which can be any value within (MGRP-1)), measurement gap timing advance (e.g., 0, 0.25 ms, 0.5 ms, etc.), etc. The UE 310 configures the PMGP with a first occurrence of gap (e.g., start of first gap in certain time resource) based on a rule, which can be pre-defined or configured. For example, the first subframe of each gap occurs at a system frame number (SFN) and subframe meeting the following condition:

SFN mod T=FLOOR(gapOffset/10)
subframe=gapOffset mod 10
with T=MGRP/10

First Embodiments: The UE Determines Status of PMGP Based on Criteria

In some aspects of embodiments in the present disclosure, the UE 310 determines, based on one or more criteria, the status of the PMGP upon (e.g., after) or at configuration of the PMGP. The PMGP status or state may be determined as activated or deactivated. The PMGP status upon or at configuration may also be called as or refer to an initial PMGP status, the PMGP status immediately after the configuration, the PMGP status from the first time resource (e.g., subframe, SFN, etc.) where the first gap of the PMGP occurs, etc. The PMGP status after the configuration can further be changed by another rule or criteria (e.g., based on received command or active BWP switching). In one example, the UE 310 may determine the PMGP status to be activated upon configuration of the PMGP (e.g., at time T0). At a later time T1 after ΔT (e.g., ΔT=T1−T0), the UE 310 may determine the PMGP status to be deactivated, and at a later time (e.g., T2), the UE 310 may determine that the PMGP status has changed to being activated, and so on.

Figure 5:
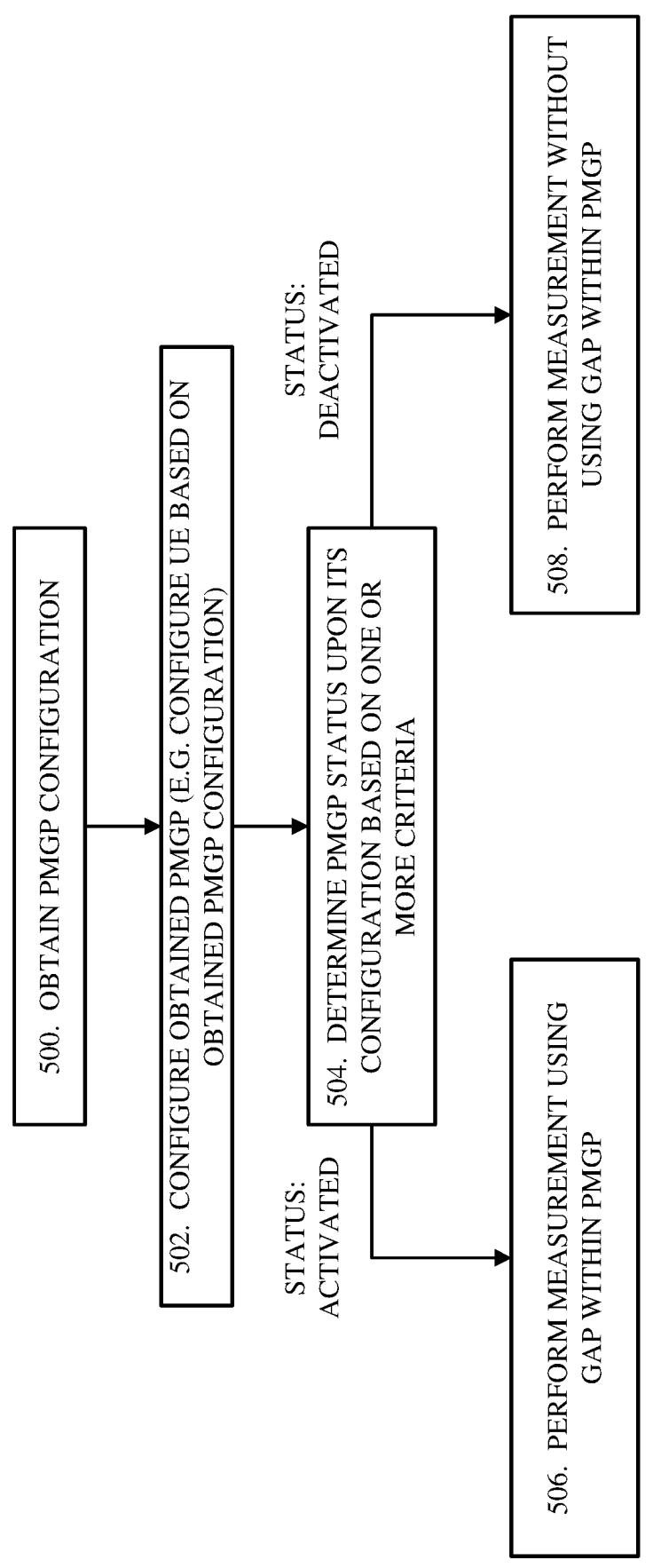
FIG. 5 illustrates a flow chart for a method performed by a UE for determining PMGP status upon PMGP configuration/setup.

A method in the UE 310 in the first embodiment is shown in FIG. 5. At step 500, the UE 310 may obtain (e.g., receive) the PMGP configuration. At step 502, the UE 310 may configure the UE 310 to operate based on the obtained PMGP configuration. At step 504, the UE 310 may determine the PMGP status based on the one or more criteria discussed herein. At step 506, when the UE 310 determines the PMGP status to be activated, the UE 310 may perform measurements by using a gap within the configured PMGP (e.g., the UE 310 may perform measurements during the gaps within the PMGP because the network will not schedule the UE 310 to receive or transmit (e.g., communicate) a signal during the gaps). Alternatively, at step 508, when the UE 310 determines the PMGP status to be deactivated, the UE 310 may perform measurements without using the gap within the configured PMGP (e.g., the UE 310 may not perform measurements during the gaps within the PMGP because the network may schedule the UE 310 to receive or transmit (e.g., communicate) a signal during the gaps).

When the PMGP determined to be activated (e.g., in an activated state or under activation status), the PMGP can be used by the UE 310 for performing the measurements such as, for example, measurements on one or more cells on one or more carrier frequencies during the gaps of the PMGP. When the PMGP is determined to be activated, the UE 310 is not scheduled (by the base station) to receive or transmit data during the gaps within the PMGP. The PMGP's activated state may also be called as 'active state,' 'used state,' etc. Similarly, the PMGP's activation status may also be called as 'usable status,' etc.

When the PMGP is determined to be deactivated (e.g., in a deactivated state or under deactivation status), the PMGP cannot be used by the UE 310 for performing the measurements such as, for example, measurements on any cell of any carrier frequency during the gaps of the PMGP. When the PMGP is determined to be deactivated, the UE 310 may be scheduled during the gaps within the PMGP. The PMGP's deactivated state may also be called as inactive state, unused state, non-gap state, etc. Similarly, the PMGP's deactivation status may also be called as inactivation status, unusable status, non-gap status, etc.

The criteria may also be called as a rule, conditions, principles, etc. The criteria can be pre-defined or configured by a network node 308. The well-defined rules or criteria ensure that both UE 310 and the network node 308 aware of each other actions during PMGP after the PMGP configuration. Examples of one or more criteria used by the UE 310 for determining the PMGP status upon the PMGP configuration include:

1. Relation Between Measurement Reference Signal and Active BWP.

One example criterion to determine the PMGP status may comprise a relation or association between a RS (e.g., SSB) configured for measurement and an active BWP used on the serving cell. The measurement may be done on the RS using PMGP if the PMGP is determined to be activated; otherwise, the measurement can be done without PMGP. The relation between the RS and the active BWP may change over time. An example of the relation is whether the RS is at a frequency fully within a bandwidth (BW) of the active BWP.

In one example, when the RS is at a frequency fully within the BW of the active BWP, the UE 310 determines the status of PMGP to be deactivated; otherwise (e.g., when the RS is at a frequency not fully within the BW of the active BWP), the UE 310 determines the status of PMGP to be activated.

In another example, the UE 310 may be configured for performing measurements on two or more carriers (e.g., measurement on a first RS (RS1) of cells of a first carrier (C1) and on a second RS (RS2) of cells of a second carrier (C2). In one example, C1 and/or C2 are carriers of serving cells; while in another example, C1 and/or C2 are carriers of non-serving cells (e.g., inter-frequency carriers, inter-RAT carriers, etc.).

In one example, when all the RSs (e.g., RS1, RS2, etc.) configured for measurements on multiple carriers (e.g., C1, C2, etc.) are at respective frequencies fully within the BW of the active BWP, the UE 310 may determine the status of the PMGP to be deactivated; otherwise (e.g., if at least one RS is at a frequency not fully within the BW of the active BWP), the UE 310 may determine the status of PMGP to be activated.

In another example, when all the RSs (e.g., RS1, RS2, etc.) configured for measurements on multiple carriers (e.g., C1, C2, etc.) are at respective frequencies fully within the BWs of their respective active BWPs (e.g., BWP1 for C1, BWP2 for C2, etc.), the UE 310 may determine the status of the PMGP to be deactivated; otherwise (e.g., if at least one RS is not fully within the BW of its respective active BWP), the UE 310 may determine the status of the PMGP to be activated.

2. Configuration of Measurements or Measurement Type.

Another example criterion to determine the PMGP status may comprise determining whether the UE 310 is configured for performing a measurement, which needs gaps. Yet another example criterion may comprise determining whether the UE 310 is configured to perform certain type(s) of measurement(s) such as, for example, positioning measurements, measurements for critical operation such as emergency services, inter-frequency measurements, intra-frequency measurements, inter-RAT measurements, etc.

In one example, when the UE 310 is configured for performing a measurement, the UE 310 may determine the status of the PMGP to be activated; otherwise, the UE 310 may determine the status of the PMGP to be deactivated.

In another example, when the UE 310 is configured for performing at least a particular type of measurement (e.g., at least a first type of measurement type), the UE 310 may determine the status of the PMGP to be activated; otherwise (when the UE 310 is configured for performing a second type of measurement but not the particular type of measurement), the UE 310 may determine the status of the PMGP to be deactivated. Examples of the first/particular type of measurement include positioning measurements (e.g., Reference Signal Time Difference (RSTD), UE Rx-Tx time difference, Positioning Reference Signal Reference Signal Received Power (PRS-RSRP), etc.) and examples of the second type of measurement include mobility measurements (e.g., Synchronization Signal RSRP (SS-RSRP), Synchronization Signal Reference Signal Received Quality (SS-RSRQ), Synchronization Signal to Interference plus Noise Ratio (SS-SINR), etc.).

3. Reference Signal Type for Measurements.

Another example criterion to determine the PMGP status may comprise determining a type of RS configured for measurements which need gaps (e.g., to be performed during the gaps within the PMGP).

In one example, when the UE 310 is configured to perform measurements associated with at least a particular type of RS (e.g., at least RS type #A) from among RSs in a given set of RSs, the UE 310 may determine the PMGP to be activated; otherwise (if configured to perform measurements associated with another type of RS from among RSs in the given set of RSs (RS type #B but not associated with type #A), the UE 310 may determine the PMGP to be deactivated.

One example of the given set of RSs may include PRS as the particular type of RS (e.g., RS type #A) and may include SSB as the other type of RS (RS type #B). Another example of the given set of RSs may include SSB as the particular type of RS (e.g., RS type #A) and my include CSI-RS as the other type of RS (RS type #B).

4. Data Transmission Status.

Another example criterion to determine the PMGP status may comprise determining whether there is ongoing data transmission (e.g., PDSCH/PDCCH reception and/or PUSCH/PUCCH transmission, etc.) between the UE 310 and one or more serving cells, while the PMGP is configured. The data transmission may comprise, for example, one or more of a first data block transmission, retransmission of a data block, ongoing Hybrid Automatic Repeat Request (HARQ) process, transmission related to scheduling of grants for UL and/or DL for a current time resource (e.g., a slot or symbol) or a future time resource (e.g., next slot, next n slots, next symbol, next n symbols, etc.), etc. In an example, a HARQ process is considered to be ongoing until the data block is correctly received by the UE 310 (e.g., when the UE 310 has transmitted ACK message). In another example, a HARQ process is considered to be ongoing until the UE 310 has received more than N retransmissions (or redundancy versions) of a first data block (e.g., N can be maximum number of retransmissions). In another example, a HARQ process is considered to be ongoing until the HARQ retransmission timer is running (e.g., until the HARQ retransmission timer expires).

The UE 310 may determine the status of the PMGP based on one or more of the following.

First, in one example, when the UE 310 determines that there is an ongoing data transmission while the PMGP is configured, the UE 310 determines the PMGP to be deactivated to enable completion of the ongoing transmissions; otherwise (when the UE 310 determines that there is no ongoing data transmission while the PMGP is configured), the UE 310 determines the PMGP to be activated.

Second, in another example, when the UE 310 determines that there is an ongoing data transmission while the PMGP is configured, then from time instance, T0, until a later time instance, T1, the UE 310 determines the PMGP to be deactivated, and after time instance T1, the UE 310 determines the PMGP to be activated. In some aspects, time instances T0 and T1 can be pre-defined or configured by the network node 308. In one example, T0 is the time when the PMGP configuration is completed. In another example, T0 is the time when the UE 310 receives PMGP configuration message from the network. In another example, T0 is the time when the UE 310 sends ACK message (e.g., HARQ ACK, Radio Link Control (RLC) level ACK, etc.) to the network to indicate completion of PMGP configuration. In one example, T1 is the time when the UE 310 has completed the ongoing transmissions. In another example, the UE 310 may determine T0 and T1 such that $\Delta T$ (e.g., $\Delta T=T1-T0$) may comprise one or more of: K1 number of MGRP (e.g., K1*MGRP), K2 number of time resources (e.g., K2*slots, K2*frames, etc.), etc.

Third, in another example, when the UE 310 determines that the UE 310 is configured for data transmission for at least K3 number of time resources (e.g., K3 slots, K3 symbols, etc.) immediately after the PMGP is configured, the UE 310 determines the PMGP to be deactivated to enable completion of the ongoing transmissions; otherwise (when the UE 310 determines that the UE 310 is configured for data transmission for fewer than K3 number of slots), the UE 310 determines the PMGP to be activated. In some aspects, the UE 310 can be configured for data transmissions using scheduling grants (e.g., for repetition of data in more than one slot, periodic data, aperiodic data, etc.).

Fourth, in another example, when the UE 310 determines that the UE 310 has transmitted more than K4 number of NACKs for DL data reception and/or has received more than K5 number of retransmissions for the same DL data block, while the PMGP is configured, the UE 310 determines the PMGP to be deactivated to enable completion of the ongoing DL transmissions without delay; otherwise, the UE 310 determines the PMGP to be activated.

Fifth, in another example, when the UE 310 determines that the UE 310 has transmitted more than K6 number of retransmissions for the same UL data block, while the PMGP is configured, the UE 310 determines the PMGP to be deactivated to enable completion of the ongoing UL transmissions without delay; otherwise, the UE 310 determines the PMGP to be activated.

5. Data Traffic Type.

Another example criterion to determine the PMGP status may comprise determining the PMGP configuration based on a data traffic type being used while the PMGP is configured. The data traffic type can be expressed in terms of one or more of: a service type, a quality target, etc. Examples of service types include eMBB, URLLC, extended Reality (XR), emergency service (e.g., IP Multimedia Subsystem (IMS) emergency bearer services), etc. Examples of XR include AR, VR, etc. Examples of quality targets include Block Error Rate (BLER), frame error rate, Signal to Interference plus Noise Ratio (SINR), Signal to Noise Ratio (SNR), etc.

Examples of impact of data traffic type on PMGP status upon PMGP configuration include the following ones.

First, in one example, when the ongoing data traffic type (while PMGP is being configured) is eMBB, the UE 310 determines the PMGP status, upon the PMGP configuration, to be activated; otherwise (for other services), the UE 310 determines the PMGP status, upon the PMGP configuration, to be deactivated.

Second, in another example, when the ongoing data traffic type (while PMGP is being configured) is XR, the UE 310 determines the PMGP status, upon the PMGP configuration, to be deactivated; otherwise (for other services) the UE 310 determines the PMGP status, upon the PMGP configuration, to be activated.

Third, in another example, when the ongoing data traffic type (while PMGP is being configured) is XR, URLLC, and/or emergency, the UE 310 determines the PMGP status, upon the PMGP configuration, to be deactivated; otherwise (for other services) the UE 310 determines the PMGP status, upon the PMGP configuration, to be activated.

Fourth, in another example, when the target quality (e.g., BLER) of the ongoing data traffic type (while PMGP is being configured) is below a certain threshold (e.g., BLER target <1%), the UE 310 determines the PMGP status, upon the PMGP configuration, to be deactivated; otherwise (e.g., BLER target ≥1%)) the UE 310 determines the PMGP status, upon the PMGP configuration, to be activated.

6. DRX Configuration Status.

Another example criterion to determine the PMGP status may comprise determining the PMGP status, upon the PMGP configuration, based on the DRX configuration status. In some aspects, the DRX configuration status may be associated with DRX cycle parameters. In some aspects, the DRX configuration may depend on whether the DRX cycle is configured, or, when DRX is configured, on whether the UE 310 is currently in DRX or in non-DRX.

The impact of DRX configuration status on PMGP status, upon the PMGP configuration, may include the followings.

First, in one example, when the UE 310 is configured with a DRX cycle (while PMGP is being configured), the UE 310 determines the PMGP status, upon the PMGP configuration, to be activated; otherwise (if no DRX is configured), the UE 310 determines the PMGP status, upon the PMGP configuration, to be deactivated.

Second, in another example, when the UE 310 is configured with DRX cycle but also DRX is used (while PMGP is being configured), the UE 310 determines the PMGP status, upon the PMGP configuration, to be activated; otherwise (if UE 310 is not in DRX (e.g., DRX inactivity timer is running due to data transmission/reception)), the UE 310 determines the PMGP status, upon the PMGP configuration, to be deactivated.

Third, in another example, the PMGP status, upon the PMGP configuration, may depend on a relation between the DRX cycle and a threshold: In one example, when the configured DRX cycle is equal to or longer than the threshold (while PMGP is being configured), the UE 310 determines the PMGP status, upon the PMGP configuration, to be deactivated; otherwise (when DRX cycle is shorter than the threshold), the UE 310 determines the PMGP status, upon the PMGP configuration, to be activated. In another example, when the configured DRX cycle is equal to or longer than the threshold (while PMGP is being configured), the UE 310 determines the PMGP status, upon the PMGP configuration, to be activated; otherwise (when DRX cycle is shorter than the threshold), the UE 310 determines the PMGP status, upon the PMGP configuration, as deactivated.

7. BWP Switching Status.

Another example criterion to determine the PMGP status may comprise determining the status of the PMGP, upon the PMGP configuration, based on the active BWP switching status. In one exemplary scenario, the PMGP configuration and the active BWP switching may occur over at least partially overlapping time. In another exemplary scenario, the PMGP configuration and the active BWP switching may occur next to each other in time (e.g., PMGP configuration starts immediately after the active BWP switching or vice versa).

The impact of BWP switching status on PMGP status upon PMGP configuration may include the followings.

First, in one example, when the UE 310 is performing active BWP switching while PMGP is being configured, the UE 310 determines the PMGP status, upon the PMGP configuration, to be a pre-defined status. In one example, the pre-defined status may be that PMGP is activated. In another example, the pre-defined status may be that PMGP is deactivated. Otherwise (when there is no active BWP switching), the UE 310 determines the PMGP status upon the PMGP configuration based on other criteria (e.g., one or more of the examples of the one or more criteria used by the UE 310 for determining the PMGP status upon the PMGP configuration discussed above).

Second, in another example, when the UE 310 is performing active BWP switching while PMGP is being configured, the UE 310 determines the PMGP status after the completion of the active BWP switching. In one example, the PMGP status after the active BWP switching may depend on whether a frequency associated with the measured RS is within the BW of the active BWP (e.g., as described in criterion "Relation between measurement reference signal and active BWP"). During the active BWP switching, the UE 310 may also be configured to determine a certain status of the PMGP that can be pre-defined or configured (e.g., the deactivated status).

8. PMGP Configuration Parameter(s).

Another example criterion to determine the PMGP status may comprise determining the status of the PMGP upon the PMGP configuration based on PMGP configuration parameters such as, for example, MGL, MGRP, gap offset, whether PMGP is per UE or per FR gap, etc.

The impact of the PMGP configuration parameters on the PMGP status, upon the PMGP configuration, may include the followings.

First, in one example, the UE 310 determines the PMGP status upon the PMGP configuration based on a relation between MGRP and a threshold. The relation can be pre-defined or configured by the network node 308. Different relations can be used in different scenarios or for different purposes.

Second, in one example, when the MGRP is equal to or longer than a certain threshold, the UE 310 may determine the PMGP status to be activated; otherwise, the UE 310 may determine the PMGP status to be deactivated.

Third, in another example, when the MGRP is equal to or longer than the certain threshold, the UE 310 may determine the PMGP status to be deactivated; otherwise, the UE 310 may determine the PMGP status to be activated.

9. Configuration of Legacy Gap Pattern.

Another example criterion to determine the PMGP status may comprise determining the status of the PMGP, upon the PMGP configuration, based on whether the UE 310 is already configured with a legacy MGP. A legacy MGP may refer to any MGP which is not PMGP. In one example, when the UE 310 is already configured with the legacy MGP, the UE 310 may determine the status of the PMGP to be deactivated; otherwise, the UE 310 may determine the PMGP status to be activated.

10. Explicit Indication.

Another example criterion to determine the PMGP status may comprise determining the status of the PMGP, upon the PMGP configuration, based on an explicit indication received from the network node 308. The explicit indication may be included in the PMGP configuration message or in a separate message. In the latter case, the UE 310 may receive the explicit message at suitable time with respect to the time of the PMGP configuration message (e.g., at most Z1 time resources before, no later than Z2 time resources after, or during the reception of PMGP configuration message).

The explicit indication may be sent via higher layer signaling (e.g., RRC signaling) and/or lower layer signaling (e.g., DCI, MAC command (MAC CE), etc.). The explicit indication (e.g., IND) may include a bit field to explicitly indicate whether, upon the PMGP configuration, the PMGP status is the activated status (e.g., IND bit=1) or is the deactivated status (e.g., IND bit=0).

After determining the PMGP status, the UE 310 may conduct one or more operations based on the determined PMGP status. Examples of the one or more operations may include the followings.

First, in one example, when the UE 310 is configured for performing a measurement and the PMGP status is determined to be activated, the UE 310 may perform the measurement using PMGP (e.g., perform the measurement during the gaps within the PMGP).

Second, in another example, when the UE 310 is configured for performing a measurement and the PMGP status is determined to be deactivated, the UE 310 may perform the measurement without PMGP (e.g., refrain from performing the measurement during the gaps within the PMGP).

Third, in another example, when the PMGP status is determined to be deactivated, and regardless of whether the UE 310 is configured for performing a measurement, the UE 310 may receive and/or transmit signals during the gaps within the PMGP.

Fourth, in another example, when the PMGP status is determined to be activated, and even when the UE 310 is not using the PMGP for measurement, the UE 310 may not receive and/or transmit signals during the gaps within the PMGP.

Fifth, in another example, when the PMGP status is determined to be activated, and when the UE 310 is not using the PMGP for measurement, the UE 310 may turn off its receiver and/or transmitter during the gaps within the PMGP to save battery power.

Sixth, in another example, when the PMGP status is determined to be activated, and when the UE 310 is not using the PMGP for measurement, the UE 310 may perform post processing of data or signals during the gaps within the PMGP to save battery power.

The network node 308 serving the UE 310 may determine the PMGP status, upon the PMGP configuration, at the UE 310 based on the same criteria as used by the UE 310 and use the status information for one or more operations. Examples of such operations may include the followings.

First, in one example, when the PMGP status is determined to be activated, the network node 308 may be refrained from scheduling the UE 310 to receive and/or transmit signals during the gaps within the PMGP. In some aspects, the network node 308 may schedule another UE 310 to receive and/or transmit signals during the gaps within the PMGP.

Second, in another example, when the PMGP status is determined to be deactivated, the network node 308 may schedule the UE 310 to receive and/or transmit signals during the gaps within the PMGP.

Third, in another example, when the PMGP status is determined to be deactivated, the network node 308 may expect to receive signals from the UE 310 during the gaps within the PMGP.

Second Embodiments: The UE's Behavior when Pre-Configured Gap Pattern Status is Undefined When the UE 310 is unable to determine the status of the PMGP upon the PMGP configuration (e.g., based on one or more criteria discussed in the first embodiment), the UE 310 may determine the status of the PMGP based on one or more default rules, which can be pre-defined (e.g., default status) or configured by the network node 308. Examples of such default rules may include the followings.

First, in one example of the default rule, the UE 310 may determine the PMGP status to be deactivated.

Second, in another example of the default rule, the UE 310 may determine the PMGP status to be activated.

Third, in another example of the default rule, the UE 310 may determine the PMGP status to be deactivated. But the UE 310 may refrain from transmitting or receiving any signal during the gaps within the PMGP until the status is explicitly determined to be deactivated by the UE 310 at later time (e.g., based on a message received from the network node 308 or as otherwise discussed in the first embodiments).

Fourth, in another example of the default rule, the UE 310 may determine the PMGP status to be activated. But the UE 310 may be refrained from performing measurements during the gaps within the PMGP until the status is explicitly determined by the UE 310 at later time (e.g., based on a message received from the network node 308 or as otherwise discussed in the first embodiment). The UE 310 may also refrain from transmitting or receiving any signal during the gaps within the PMGP.

Fifth, in some aspects, the UE 310 may inform the network node 308 that the UE 310 is unable to determine status of the PMGP upon PMGP configuration.

In some aspects, the UE 310 may be unable to determine the status of the PMGP upon PMGP configuration due to, for example, lack of available resources at the configuration as UE 310 may have to process other information such as data, or low signal quality, etc. For example, under low signal quality (e.g., SINR below a certain threshold), the UE 310 may not reliably receive an explicit indicator indicating the PMGP status upon PMGP configuration.

Additional Description

Figure 6:
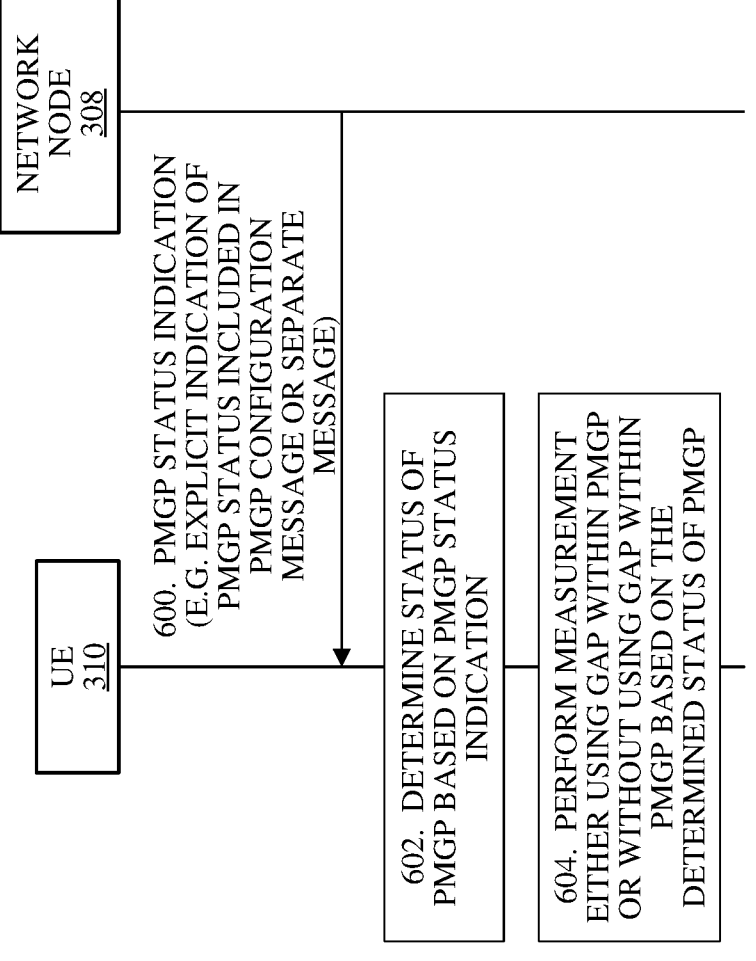
FIG. 6 illustrates a flow chart for a method performed by a UE for receiving a PMGP status indication from a network node.

FIG. 6 illustrates a flow chart for a method performed by a UE for receiving a PMGP status indication from a network node.

In step 600, the UE receives a PMGP status indication from the network node. For example, the PMGP status indication is an explicit indication about the status of the PMGP, which may be included in the PMGP configuration message or in a separate message that is not the PMGP configuration message.

In step 602, the UE determines a status of a PMGP based on the received PMGP status indication.

In step 604, the UE performs a measurement either using a gap within the PMGP or without using the gap within the PMGP, based on the determined status of the PMGP.

Figure 7:
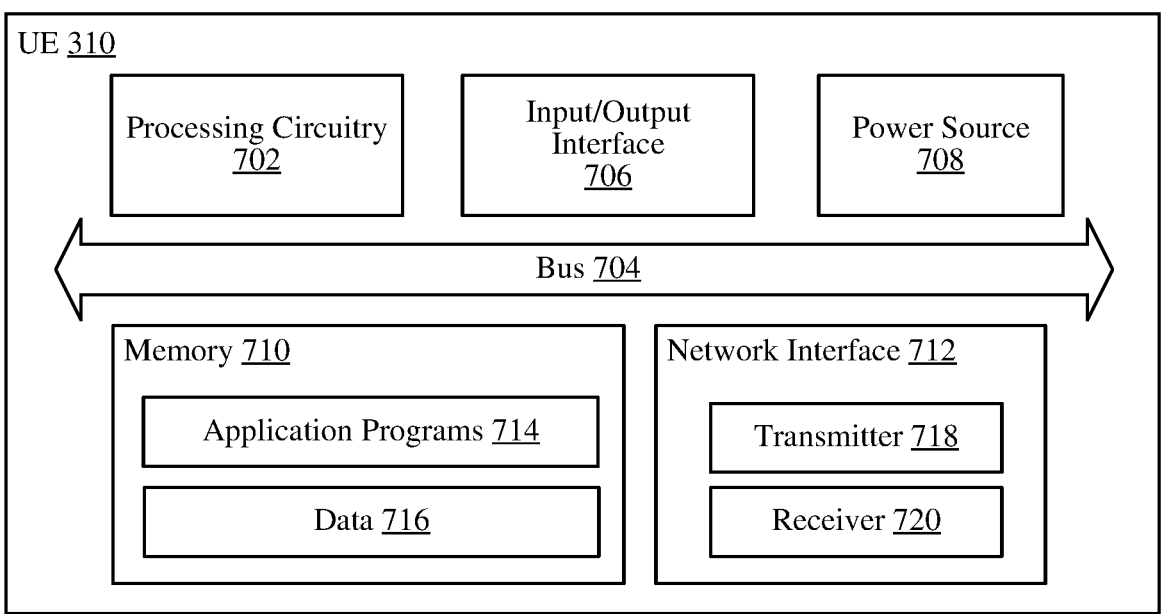
FIG. 7 illustrates a UE in accordance with some embodiments.

FIG. 7 shows a UE 310 in accordance with some embodiments. As used herein, a UE refers to a device capable, configured, arranged and/or operable to communicate wirelessly with network nodes and/or other UEs. Examples of a UE include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted or vehicle embedded/integrated wireless device, etc. Other examples include any UE identified by the 3rd Generation Partnership Project (3GPP), including a narrow band internet of things (NB-IOT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

In FIG. 7, the UE 310 includes processing circuitry 702 that is operatively coupled via a bus 704 to an input/output interface 706, power source 708, memory 710, network interface 712, and/or any other component, or any combination thereof. Certain UEs may utilize all of the components shown in FIG. 7 or only a subset of the components. The level of integration between the components may vary from one UE to another UE. Further, certain UEs may contain multiple instances of a component, such as multiple processors, memories, transceivers, transmitters, receivers, etc.

In FIG. 7, the processing circuitry 702 is configured to process instructions and data. The processing circuitry 702 may be configured to implement any sequential state machine operative to execute instructions stored as machine-readable computer programs in the memory 710, such as one or more hardware-implemented state machines (e.g., in discrete logic, field-programmable gate arrays (FPGAs), application specific integrated circuits (ASICs), etc.); programmable logic together with appropriate firmware; one or more stored program, general-purpose processors, such as a microprocessor or digital signal processor (DSP), together with appropriate software; or any combination of the above. For example, the processing circuitry 702 may include multiple central processing units (CPUs). Data may be information in any form suitable for use by a computer.

In the present example, the input/output interface 706 may be configured to provide an interface or interfaces to an input device, output device, or one or more input and/or output devices. Examples of an output device include speaker, a sound card, a video card, a display, a monitor, a printer, an actuator, an emitter, a smartcard, another output device, or any combination thereof. An input device may allow a user to capture information into the UE 310. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. An output device may use the same type of interface port as an input device. For example, a Universal Serial Bus (USB) port may be used to provide an input device and an output device.

The power source 708 may, in some embodiments, be in the form of a battery or battery pack. Other types of power sources, such as an external power source (e.g., an electricity outlet), photovoltaic devices or power cells, may also be used. The power source 708 may further include power circuitry for delivering power from the power source 708 itself, and/or an external power source, to the various parts of the UE 310 via input circuitry or an interface such as an electrical power cable. Delivering power may be, for example, for charging of the power source 310. Power circuitry may perform any formatting, converting, or other modification to the power from the power source 310 to make the power suitable for the respective components of the UE 310 to which power is supplied.

The memory 710 may be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 710 includes one or more application programs 714, such as an operating system, web browser application, a widget, gadget engine, or other application, and corresponding data 716. The memory 710 may store, for use by the UE 310, any of a variety of various operating systems or combinations of operating systems.

The memory 710 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 710 may allow the UE 310 to access instructions, application programs and the like, stored on transitory or non-transitory memory media, to off-load data, or to upload data. An article of manufacture, such as one utilizing a communication system may be tangibly embodied in the memory 710, which may comprise a device readable medium.

The processing circuitry 702 may be configured to communicate with an access network or other network using the network interface 712. The network interface 712 may comprise one or more communication subsystems. The network interface 712 may be configured to include one or more transceivers used to communicate with an access network, such as by communicating with one or more remote transceivers of another device capable of wireless communication (e.g., another UE or network node in an access network). Each transceiver may include a transmitter 718 and/or a receiver 720 appropriate to provide network communications (e.g., optical, electrical, frequency allocations, and so forth). Moreover, the transmitter 718 and receiver 720 may be coupled to one or more antennas, and may share circuit components, software or firmware, or alternatively may be implemented separately.

In the illustrated embodiment, the communication functions of the network interface 712 may include cellular communication, Wi-Fi communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

In an example scenario, UEs might, in one example, form part of an environmental or home/building monitoring system for monitoring one or more ambient conditions, and could for example comprise a sensor for detecting temperature, infrared (IR) levels, water levels, air toxicity levels etc. These conditions may be monitored for the purpose of detecting natural events (e.g., earthquakes, fires, floods etc.); for detecting the failure of household/building equipment or for automating building controls such as light and/or ambient temperature levels. Data captured by a UE and/or remote device may be provided via wireless connection to the network node 308b for communication to a control center or personal device.

Regardless of the type of sensor, a UE may provide an output of data captured by its sensors, through its network interface 712, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a network interface configured to receive wireless input from the network node 308*b* via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an IoT device, may be a device for use in one or more application domains, these domains comprising, but not limited to, home, city, wearable technology, extended reality, agriculture, industrial application and healthcare. A UE in the form of an IoT device comprises circuitry and/or software in dependence of the intended application of the IoT device in addition to a network interface, processing circuitry, power source and other components as described below in relation to the UE 310 shown in FIG. 7.

As yet another specific example, in an Internet of Things (IOT) scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IOT standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a UE may represent a vehicle or other equipment that is capable of monitoring and/or reporting on its operational status or other functions associated with its operation. A UE as described above may represent the endpoint of a wireless connection, in which case the device may be referred to as a wireless terminal. Furthermore, a UE as described above may be mobile, in which case it may also be referred to as a mobile device or a mobile terminal.

By way of example, a UE in the form of the IoT device for a home, an office, a building or an infrastructure may be a baking scale, a coffee machine, a grill, a fridge, a refrigerator, a freezer, a microwave oven, an oven, a toaster, a water tap, a water heater, a water geyser, a sauna, a vacuum cleaner, a washer, a dryer, a dishwasher, a door, a window, a curtain, a blind, a furniture, a light bulb, a fan, an air-conditioner, a cooler, an air purifier, a humidifier, a speaker, a television, a laptop, a personal computer, a gaming console, a remote control, a vent, an iron, a steamer, a pressure cooker, a stove, an electric stove, a hair dryer, a hair styler, a mirror, a printer, a scanner, a photocopier, a projector, a hologram projector, a 3D printer, a drill, a hand-dryer, an alarm clock, a clock, a security camera, a smoke alarm, a fire alarm, a connected doorbell, an electronic door lock, a lawnmower, a thermostat, a plug, an irrigation control device, a flood sensor, a moisture sensor, a motion detector, a weather station, an electricity meter, a water meter or a gas meter.

As further ways of example, the IoT device for use in a city, urban or rural areas may be connected street lighting, a connected traffic light, a traffic camera, a connected road sign, an air control/monitor, a noise level detector, a transport congestion monitoring device, a transport controlling device, an automated toll payment device, a parking payment device, a sensor for monitoring parking usage, a traffic management device, a digital kiosk, a bin, an air quality monitoring sensor, a bridge condition monitoring sensor, a fire hydrant, a manhole sensor, a tarmac sensor, a water fountain sensor, a connected closed circuit television, a scooter, a hoverboard, a ticketing machine, a ticket barrier, a metro rail, a metro station device, a passenger information panel, an onboard camera or other connected device on a public transport vehicle.

As further ways of example, the IoT device may be a wearable device, or a device related to extended reality, wherein the device related to extended reality may be a device related to augmented reality, virtual reality, merged reality or mixed reality. Examples of such IoT devices may be a smart-band, a tracker, a haptic glove, a haptic suit, a smartwatch, clothes, eyeglasses, a head mounted display, an ear pod, an activity monitor, a fitness monitor, a heart rate monitor, a ring, a key tracker, a blood glucose meter or a pressure meter.

As further ways of example, the IoT device may be an industrial application device wherein an industrial application device may be an industrial unmanned aerial vehicle, an intelligent industrial robot, a vehicle assembly robot or an automated guided vehicle.

As further ways of example, the IoT device may be a transportation vehicle, wherein a transportation vehicle may be a bicycle, a motor bike, a scooter, a moped, an auto rickshaw, a rail transport, a train, a tram, a bus, a car, a truck, an airplane, a boat, a ship, a ski board, a snowboard, a snow mobile, a hoverboard, a skateboard, roller-skates, a vehicle for freight transportation, a drone, a robot, a stratospheric aircraft, an aircraft, a helicopter or a hovercraft.

As further ways of example, the IoT device may be a health or fitness device, wherein a health or fitness device may be a surgical robot, an implantable medical device, a non-invasive medical device, or a stationary medical device which may be: an in-vitro diagnostic device, a radiology device, a diagnostic imaging device or an x-ray device.

A vehicle as described herein could be autonomous, remote-controlled or controlled by a driver. A robot as described herein typically comprises one or more sensors and/or actuators to provide to the robot the capability to change its location whether autonomously or at the direction of a user, i.e., through remote control. A remote-controlled apparatus, such as a vehicle or a robot, may receive instructions on movement, actuating or sensing from a user via a wireless connection and provide location, sensor or video information back to the user via wireless connection. An autonomous vehicle or robot may receive alerts and other messages from other vehicles, robots and/or infrastructure sensors via a wireless connection as well as provide its own telemetry data to others via the wireless connection. An autonomous vehicle or robot may comprise one or more sensors for mapping an environment or terrain. The sensors might include one or more of: a range sensor, imaging device, motion sensor, or barometric sensor. The autonomous vehicle or robot might include a positioning system for calculating its position, with the position data being communicated to a network node via wireless connection, which may in turn provide the data to a host, such as an original equipment manufacturer (OEM) server.

A remote controller as described herein may be a device dedicated to controlling other UEs or a computer with a program or application that provides control of other UEs. For example, the remote controller may receive a video signal via a wireless connection from a remote surgical room, and then issue commands via the wireless connection to a remote surgical machine that can execute the commands.

In practice any number of UEs may be used together with respect to a single use case. For example, a UE might be integrated in a drone and provide the drone's speed information (obtained through a speed sensor) to a UE that is a remote controller operating the drone. When the user makes changes from the remote controller, the UE may adjust the throttle on the drone (e.g., by controlling an actuator) to increase or decrease the drone's speed. The UE can also include more than one of the functionalities described above. For example, a UE might comprise the sensor and the actuator, and handle communication of data for both the speed sensor and the actuators.

Figure 8:
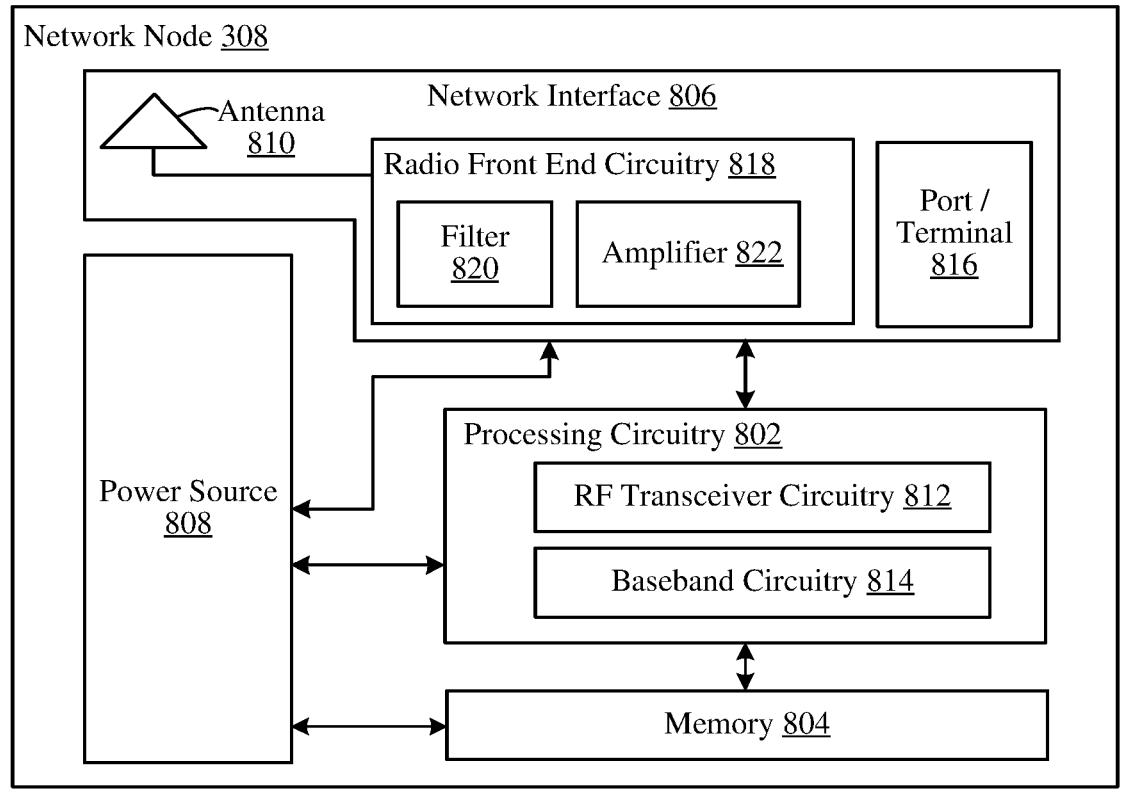
FIG. 8 illustrates a network node in accordance with some embodiments.

FIG. 8 shows a network node 308 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), Operation and Maintenance (O&M) nodes, Operations Support System (OSS) nodes, Self-Organizing Network (SON) nodes, positioning nodes (e.g., evolved Serving Mobile Location Centers (E-SMLCs)), and/or Minimization of Drive Tests (MDTs).

The network node 308 includes a processing circuitry 802, memory 804, network interface 806, and power source 808. The network node 308 may be composed of multiple physically separate components (e.g., a NodeB component and a RNC component, or a BTS component and a BSC component, etc.), which may each have their own respective components. In certain scenarios in which network node 308 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 308 may be configured to support multiple radio access technologies (RATs). In such embodiments, some components may be duplicated (e.g., separate memory 804 for different RATs) and some components may be reused (e.g., a same antenna 810 may be shared by different RATs). The network node 308 may also include multiple sets of the various illustrated components for different wireless technologies integrated into network node 308, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 308.

The processing circuitry 802 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 308 components, such as the memory 804, to provide network node 308 functionality.

In some embodiments, processing circuitry 802 may include a system on a chip (SOC). In some embodiments, the processing circuitry 802 may include one or more of radio frequency (RF) transceiver circuitry 812 and baseband processing circuitry 814. In some embodiments, RF transceiver circuitry 812 and baseband processing circuitry 814 may be on separate chips (or sets of chips), boards, or units, such as radio units and digital units. In alternative embodiments, part or all of RF transceiver circuitry 812 and baseband processing circuitry 814 may be on the same chip or set of chips, boards, or units.

Memory 804 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by the processing circuitry 802. The memory 804 may store any suitable instructions, data or information, including a computer program, software, an application including one or more of logic, rules, code, tables, etc. and/or other instructions capable of being executed by processing circuitry 802 and, utilized by network node 308. The memory 804 may be used to store any calculations made by the processing circuitry 802 and/or any data received via the network interface 806. In some embodiments, the processing circuitry 802 and memory 804 may be considered to be integrated.

The network interface 806 is used in the wired or wireless communication of signaling and/or data between a network node, access network, and/or UE. As illustrated, the network interface 806 comprises port(s)/terminal(s) 816 to send and receive data, for example to and from the network 306 over a wired connection. The network interface 806 also includes radio front end circuitry 818 that may be coupled to, or in certain embodiments a part of, the antenna 810. Radio front-end circuitry 818 comprises filters 820 and amplifiers 822. Radio front-end circuitry 818 may be connected to an antenna 810 and processing circuitry 802. Radio front-end circuitry may be configured to condition signals communicated between antenna 810 and processing circuitry 802. Radio front-end circuitry 818 may receive digital data that is to be sent out to other network nodes or UEs via a wireless connection. Radio front end circuitry 818 may convert the digital data into a radio signal having the appropriate channel and bandwidth parameters using a combination of filters 820 and/or amplifiers 822. The radio signal may then be transmitted via the antenna 810. Similarly, when receiving data, the antenna 810 may collect radio signals which are then converted into digital data by radio front-end circuitry 818. The digital data may be passed to the processing circuitry 802. In other embodiments, the network interface may comprise different components and/or different combinations of components.

In certain alternative embodiments, the network node 308 may not include separate radio front-end circuitry 818, instead, the processing circuitry 802 may include radio front end circuitry and may be connected to the antenna 810 without separate radio front end circuitry 818. Similarly, in some embodiments, all or some of RF transceiver circuitry 812 may be considered a part of the network interface 806. In still other embodiments, the network interface 806 may include one or more ports or terminals 816, radio front end circuitry 818, and RF transceiver circuitry 812, as part of a radio unit (not shown), and the network interface 806 may communicate with baseband processing circuitry 814, which is part of a digital unit (not shown).

The antenna 810 may include one or more antennas, or antenna arrays, configured to send and/or receive wireless signals. The antenna 810 may be coupled to radio front end circuitry 818 and may be any type of antenna capable of transmitting and receiving data and/or signals wirelessly. In some embodiments, the antenna 810 may comprise one or more omni-directional, sector or panel antennas operable to transmit/receive radio signals within one or more ranges or bandwidths between, for example, 2 GHz and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as multiple-input and multiple-output (MIMO). In certain embodiments, the antenna 810 may be separate from the network node 308 and may be connectable to the network node 308 through an interface or port.

The antenna 810, network interface 806, and/or processing circuitry 802 may be configured to perform any receiving operations and/or certain obtaining operations described herein as being performed by the network node. Any information, data and/or signals may be received from a UE, another network node and/or any other network equipment. Similarly, the antenna 810, network interface 806, and/or processing circuitry 802 may be configured to perform any transmitting operations described herein as being performed by the network node. Any information, data and/or signals may be transmitted to a UE, another network node and/or any other network equipment.

The power source 808 is configured to provide power to the various components of network node 308 in a form suitable for the respective components (e.g., at a voltage and current level needed for each respective component). The power source 808 may further comprise, or be coupled to, power management circuitry to supply the components of the network node 308 with power for performing the functionality described herein. For example, the network node 308 may be connectable to an external power source (e.g., the power grid, an electricity outlet) via an input circuitry or interface such as an electrical cable, whereby the external power source supplies power to power circuitry of the power source 808. As a further example, the power source 808 may comprise a source of power in the form of a battery or battery pack which is connected to, or integrated in, power circuitry. The battery may provide backup power should the external power source fail. Other types of power sources, such as photovoltaic devices, may also be used.

Alternative embodiments of the network node 308 may include additional components beyond those shown in FIG. 8 that may be responsible for providing certain aspects of the network node's functionality, including any of the functionality described herein and/or any functionality necessary to support the subject matter described herein. For example, the network node 308 may include user interface equipment to allow input of information into the network node 308 and to allow output of information from the network node 308. This may allow a user to perform diagnostic, maintenance, repair, and other administrative functions for the network node 308.

Figure 9:
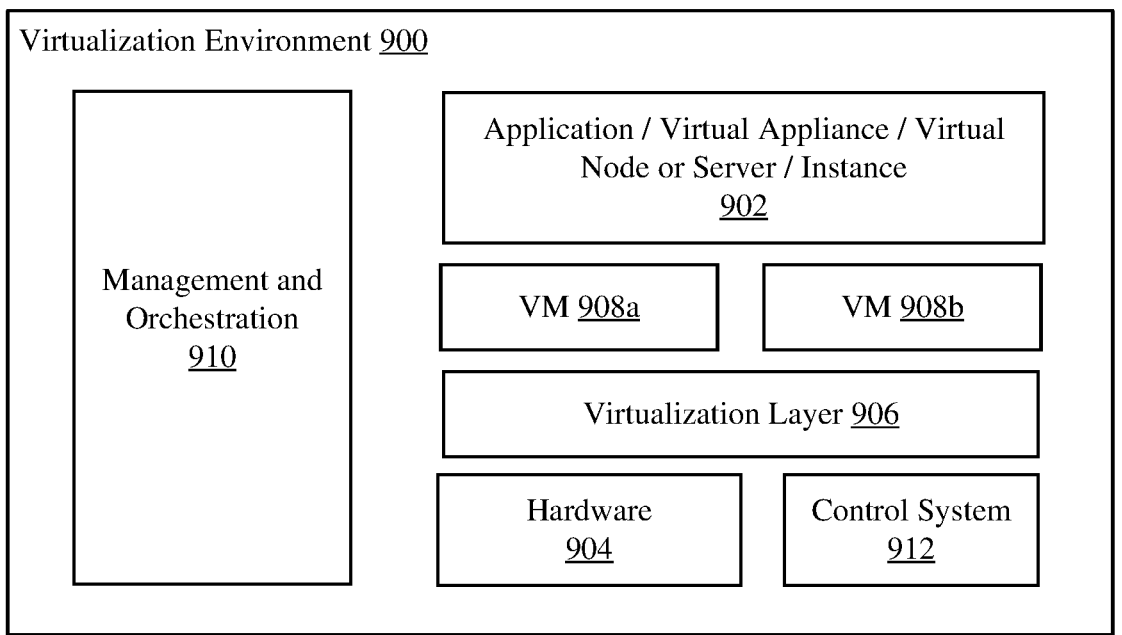
FIG. 9 is a block diagram illustrating a virtualization environment in which functions implemented by some embodiments may be virtualized.

FIG. 9 is a block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 900 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 902 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 904 includes processing circuitry, memory that stores software and/or instructions executable by hardware processing circuitry, and/or other hardware devices as described herein, such as a network interface, input/output interface, and so forth. Software may include any type of software including software for instantiating one or more virtualization layers 906 (also referred to as hypervisors), software to execute VMs 908a and 908b (generally referred as VMs 908) as well as software allowing it to execute functions, features and/or benefits described in relation with some embodiments described herein. During operation, processing circuitry executes the software to instantiate the hypervisor or virtualization layer 906, which may sometimes be referred to as a virtual machine monitor (VMM). A virtualization layer 906 may present a virtual operating platform that appears like networking hardware to the VMs 908.

The VMs 908 comprise virtual processing, virtual memory, virtual networking or interface and virtual storage, and may be run by a corresponding virtualization layer 906 or hypervisor. Different embodiments of the instance of a virtual appliance 902 may be implemented on one or more of VMs 908, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, VM 908 may be a software implementation of a physical machine that runs programs as if they were executing on a physical, non-virtualized machine. Each of the VMs 908, and that part of hardware 904 that executes that VM, be it hardware dedicated to that VM and/or hardware shared by that VM with others of the VMs, forms a separate virtual network elements. Still in the context of NFV, a virtual network function is responsible for handling specific network functions that run in one or more VMs 908 on top of the hardware 904 and corresponds to the application 902.

Hardware 904 may be implemented in a standalone network node with generic or specific components. Hardware 904 may implement some functions via virtualization. Alternatively, hardware 904 may be part of a larger cluster of hardware (e.g. such as in a data center or CPE) where many hardware nodes work together and are managed via management and orchestration 910, which, among others, oversees lifecycle management of applications 902. In some embodiments, hardware 904 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be effected with the use of control system 912 which may alternatively be used for communication between hardware nodes and radio units.

Figure 10:
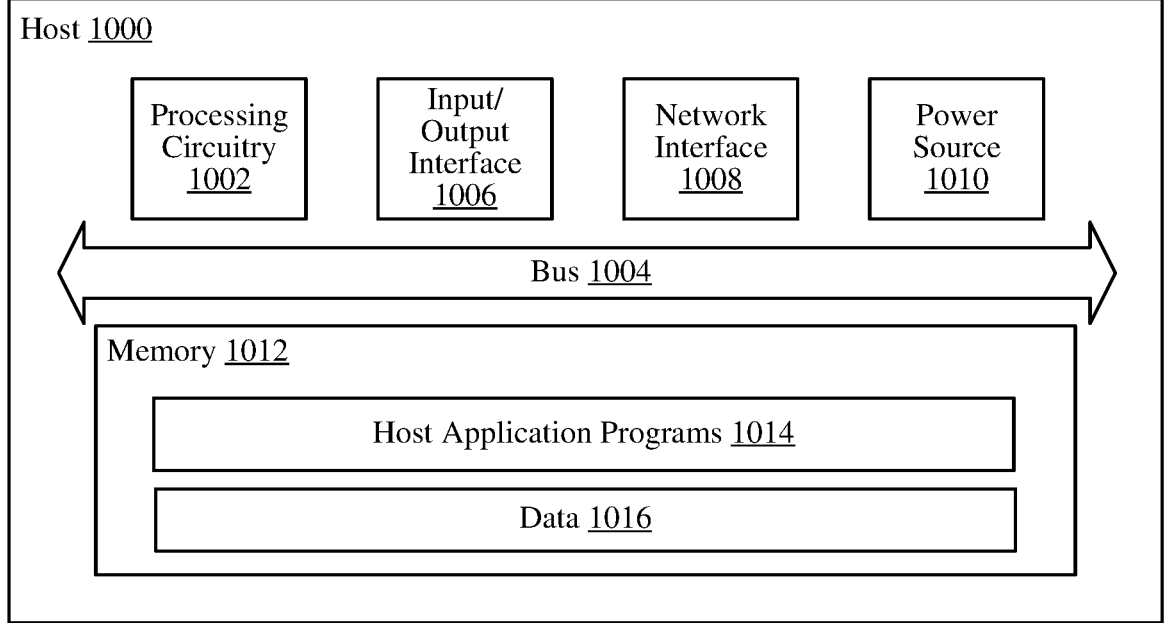
FIG. 10 is a block diagram of a host, in accordance with some embodiments.

FIG. 10 is a block diagram of a host 1000, which may be an embodiment of the host 312 of FIG. 3, in accordance with various aspects described herein. As used herein, the host 1000 may be embodied in various combinations hardware and/or software, including a standalone server, a cloud-implemented server, a distributed server, a virtual machine or container, or as processing resources in a server farm. The host 1000 may provide one or more services to one or more UEs.

The host 1000 includes processing circuitry 1002 that is operatively coupled via a bus 1004 to an input/output interface 1006, network interface 1008, power source 1010, and memory 1012. Other components may be included in other embodiments. Features of these components may be substantially similar to those described with respect to the devices of previous figures, such as FIGS. 7 and 8, such that the descriptions thereof are generally applicable to the corresponding components of host 1000.

The memory 1012 may include one or more computer programs including one or more host application programs 1014 and data 1016, which may include user data, e.g., data generated by a UE for the host 1000 or data generated by the host 1000 for a UE. Embodiments of host 1000 may utilize only a subset or all of the components shown. The host application programs 1014 may be implemented in a container-based architecture and may provide support for video codecs (e.g., HEVC, AVC, MPEG, VP9) and audio codecs (e.g., AAC, MPEG, G.711), including transcoding for multiple different classes, types, or implementations of UEs (e.g., handsets, desktop computers, wearable display systems, heads-up display systems). The host application programs 1014 may also provide for user authentication and licensing checks and may periodically report health, routes, and content availability to a central node, such as a device in or on the edge of the core network 306. Accordingly, the host 1000 may select and/or indicate a different host for over-the-top services for a UE. The host application programs 1014 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 11:
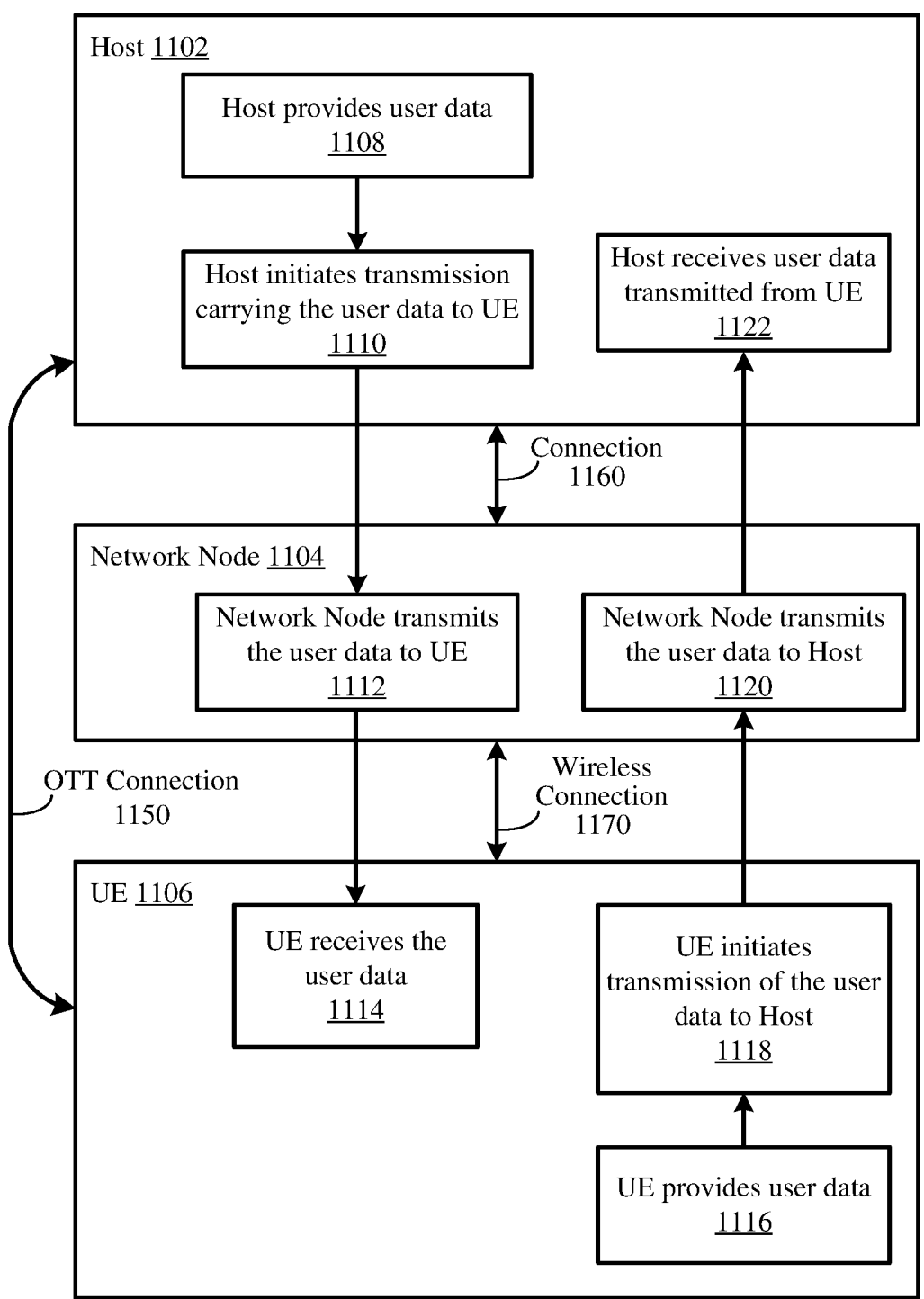
FIG. 11 shows a communication diagram of a host communicating via a network node with a UE over in accordance with some embodiments.

FIG. 11 shows a communication diagram of a host 1102 communicating via a network node 1104 with a UE 1106 over a partially wireless connection in accordance with some embodiments. Example implementations, in accordance with various embodiments, of the UE (such as a UE 310a of FIG. 3 and/or FIG. 7), network node (such as network node 308a of FIG. 3 and/or the network node of FIG. 8), and host (such as host 312 of FIG. 3 and/or host 1000 of FIG. 10) discussed in the preceding paragraphs will now be described with reference to FIG. 11.

Like host 1000, embodiments of host 1102 includes hardware, such as a communication interface, processing circuitry, and memory. The host 1102 also includes software, which is stored in or accessible by host 1102 and executable by the processing circuitry. The software includes a host application that may be operable to provide a service to a remote user, such as UE 1106 connecting via an over-the-top (OTT) connection 1150 extending between the UE 1106 and host 1102. In providing the service to the remote user, a host application may provide user data which is transmitted using the OTT connection 1150.

The network node 1104 includes hardware enabling it to communicate with host 1102 and with UE 1106. The connection 1160 may be direct or pass through a core network (like core network 306 of FIG. 3) and/or one or more other intermediate networks, such as one or more public, private or hosted networks. For example, an intermediate network may be a backbone network or the Internet.

The UE 1106 includes hardware and software, which is stored in or accessible by UE 1106 and executable by the UEs processing circuitry. The software includes a client application, such as a web browser or an operator-specific "app" that may be operable to provide a service to a human or non-human user via UE 1106 with the support of the host 1102. In the host 1102, an executing host application may communicate with the executing client application via the OTT connection 1150 terminating at the UE 1106 and host 1102. In providing the service to the user, the UE's client application may receive request data from the host's host application and provide user data in response to the request data. The OTT connection 1150 may transfer both the request data and the user data. The UE's client application may interact with the user to generate the user data that it provides to the host application through the OTT connection 1150.

The OTT connection 1150 may extend via a connection 1160 between the host 1102 and the network node 1104 and via the wireless connection 1170 between the network node 1104 and the UE 1106 to provide the connection between the host 1102 and the UE 1106. The connections 1160 and 1170, over which the OTT connection 1150 may be provided, have been drawn abstractly to illustrate the communication between host 1102 and UE 1106 via network node 1104, without explicit reference to any intermediary devices and the precise routing of messages via these devices.

As an example of transmitting data via the OTT connection 1150, in step 1108, the host 1102 provides user data, which may be performed by executing a host application. In some embodiments, the user data is associated with a particular human user interacting with the UE 1106. In other embodiments, the user data is associated with a UE 1106 that shares data with the host 1102 without explicit human interaction. In step 1110, the host 1102 initiates a transmission carrying the user data towards the UE 1106. The host 1102 may initiate the transmission responsive to a request transmitted by the UE 1106. The request may be caused by human interaction with the UE 1106 or by operation of the client application executing on the UE 1106. The transmission may pass via the network node 1104, in accordance with the teachings of the embodiments described throughout this disclosure. Accordingly, in step 1112, the network node 1104 transmits to the UE 1106 the user data which was carried in the transmission that the host 1102 initiated, in accordance with the teachings of the embodiments described throughout this disclosure. In step 1114, the UE 1106 receives the user data carried in the transmission, which may be performed by a client application executed on the UE 1106 associated with the host application executed by the host 1102.

In some examples, the UE 1106 executes a client application which provides user data to the host 1102. The user data may be provided in reaction or response to the data received from the host 1102. Accordingly, in step 1116, the UE 1106 may provide user data, which may be performed by executing the client application. In providing the user data, the client application may further consider user input received from the user via an input/output interface of the UE 1106. Regardless of the specific manner in which the user data was provided, the UE 1106 initiates, in step 1118, transmission of the user data towards the host 1102 via the network node 1104. In step 1120, in accordance with the teachings of the embodiments described throughout this disclosure, the network node 1104 receives user data from the UE 1106 and initiates transmission of the received user data towards the host 1102. In step 1122, the host 1102 receives the user data carried in the transmission initiated by the UE 1106.

One or more of the various embodiments improve the performance of OTT services provided to UE 1106 using the OTT connection 1150, in which wireless connection 1170 forms the last segment. More precisely, the teachings of these embodiments may improve, for example, data throughput, efficient use of network resources (e.g., bandwidth, management resources, etc.), data rate, latency, power consumption, etc. and thereby provide one or more benefits including reduced user waiting time, relaxed restriction of file size, better responsiveness, extended battery life, etc.

In an example scenario, factory status information may be collected and analyzed by host 1102. As another example, host 1102 may process audio and video data which may have been retrieved from a UE for use in creating maps. As another example, host 1102 may collect and analyze real-time data to assist in controlling vehicle congestion (e.g., controlling traffic lights). As another example, host 1102 may store surveillance video uploaded by a UE. As another example, host 1102 may store or control access to media content such as video, audio, VR or AR which it can broadcast, multicast or unicast to UEs. As other examples, host 1102 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1150 between host 1102 and UE 1106, in response to variations in the measurement results. The measurement procedure and/or the network functionality for reconfiguring the OTT connection may be implemented in software and hardware of host 1102 or in software and hardware of UE 1106, or both. In embodiments, sensors (not shown) may be deployed in or in association with other devices through which the OTT connection 1150 passes; the sensors may participate in the measurement procedure by supplying values of the monitored quantities exemplified above, or supplying values of other physical quantities from which software may compute or estimate the monitored quantities. The reconfiguring of the OTT connection 1150 may include message format, retransmission settings, preferred routing etc.; the reconfiguring need not directly alter the operation of network node 110411. Such procedures and functionalities may be known and practiced in the art. In certain embodiments, measurements may involve proprietary UE signaling facilitating host 1102's measurements of throughput, propagation times, latency and the like. The measurements may be implemented in that software causes messages to be transmitted, in particular empty or 'dummy' messages, using the OTT connection 1150 while it monitors propagation times, errors, etc.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionalities may be provided by the processing circuitry without executing instructions stored on a separate or discrete device readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Those skilled in the art will recognize improvements and modifications to the embodiments of the present disclosure. All such improvements and modifications are considered within the scope of the concepts disclosed herein.

The invention claimed is:

1. A method performed by a User Equipment, UE, for using a Pre-Configured Measurement Gap Pattern, PMGP, the method comprising:
    responsive to, based on one or more default rules, determining an initial status of the PMGP is activated, refraining from performing measurements during gaps within the PMGP;
    determining an explicit status of the PMGP based on one or more criteria, wherein the explicit status is either activated or deactivated; and
    responsive to determining that the explicit status is activated, performing a measurement using the gaps within the PMGP.

2. The method of claim 1, wherein the one or more criteria comprise a relation or association between a reference signal configured for measurement and an active bandwidth part on a serving cell of the UE.

3. The method of claim 1, wherein the one or more criteria comprise a criterion that a reference signal configured for measurement be fully within a bandwidth of an active bandwidth part on a serving cell of the UE.

4. The method of claim 3, wherein determining the explicit status of the PMGP based on the one or more criteria comprises determining that the explicit status of the PMGP is to be deactivated if the reference signal configured for measurement is fully within the bandwidth of the active bandwidth part on the serving cell of the UE.

5. The method of claim 3, wherein determining the explicit status of the PMGP based on the one or more criteria comprises determining that the explicit status of the PMGP is to be activated if the reference signal configured for measurement is not fully within the bandwidth of the active bandwidth part on the serving cell of the UE.

6. The method of claim 2, wherein the reference signal is a Synchronization Signal Block, SSB.

7. The method of claim 1, wherein the one or more criteria comprises a criterion of whether the UE is configured for performing a measurement which needs measurement gaps.

8. The method of claim 1, wherein the one or more criteria comprises a criterion of whether the UE is configured to perform one or more certain types of measurements.

9. The method of claim 8, wherein the one or more certain types of measurements comprise inter-frequency measurements, intra-frequency measurements, or inter-RAT measurements.

10. The method of claim 1, wherein the one or more criteria comprises a timer.

11. The method of claim 1, further comprising obtaining a PMGP configuration from a network node, wherein determining the explicit status of the PMGP includes determining the explicit status of the PMGP based on the PMGP configuration.

12. The method of claim 1, wherein the one or more criteria is pre-defined or configurable by a network node in communication with the UE.

13. The method of claim 1, wherein determining, based on the one or more criteria, the explicit status of the PMGP comprises receiving a message from a network node in communication with the UE, the message indicating the explicit status of the PMGP.

14. A User Equipment, UE, comprising:

one or more transmitters;

one or more receivers; and processing circuitry associated with the one or more transmitters and the one or more receivers, the processing circuitry configured to cause the UE to:

responsive to, based on one or more default rules, determining an initial status of the PMGP is activated, refrain from performing measurements during gaps within the PMGP;

determine an explicit status of the PMGP based on one or more criteria, wherein the explicit status is either activated or deactivated; and responsive to determining that the explicit status is activated, perform a measurement using the gaps within the PMGP.

15. The method of claim 1, further comprising responsive to determining that the initial status of the PMGP is activated, refraining from transmitting a signal during the gaps within the PMGP and/or receiving a signal during the gaps within the PMGP.

* * * * *